(12) United States Patent
Tappen et al.

(10) Patent No.: US 9,704,054 B1
(45) Date of Patent: Jul. 11, 2017

(54) CLUSTER-TRAINED MACHINE LEARNING FOR IMAGE PROCESSING

(71) Applicant: Amazon Technologies, Inc., Seattle, WA (US)

(72) Inventors: Marshall Friend Tappen, Bainbridge Island, WA (US); Avinash Aghoram Ravichandran, Seattle, WA (US); Hakan Boyraz, Seattle, WA (US); Baoyuan Liu, Orlando, FL (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 14/870,575

(22) Filed: Sep. 30, 2015

(51) Int. Cl.
G06K 9/62 (2006.01)
G06K 9/46 (2006.01)

(52) U.S. Cl.
CPC ............. *G06K 9/46* (2013.01); *G06K 9/6218* (2013.01); *G06K 9/6267* (2013.01)

(58) Field of Classification Search
CPC .... G06K 9/46; G06K 9/6218; G06K 9/00718; G06K 9/6267; G06K 9/00147; G06F 17/30247; G06F 17/30268; G06F 17/30705; G06N 7/005; G06N 99/005
See application file for complete search history.

(56) References Cited

U.S. PATENT DOCUMENTS

| | | | |
|---|---|---|---|
| 9,519,868 B2 * | 12/2016 | Criminisi | G06N 99/005 |
| 2002/0161763 A1 * | 10/2002 | Ye | G06F 21/55 |
| 2013/0236081 A1 * | 9/2013 | Nakamura | G06K 9/00147 |
| | | | 382/133 |
| 2014/0108842 A1 * | 4/2014 | Frank | G06F 17/28 |
| | | | 713/323 |
| 2015/0019204 A1 * | 1/2015 | Simard | G06F 17/2785 |
| | | | 704/9 |
| 2016/0078364 A1 * | 3/2016 | Chiu | G06F 17/30672 |
| | | | 706/11 |

(Continued)

OTHER PUBLICATIONS

Zhao X., , Guan S., and Man K. L., "An output grouping based approach to multiclass classification using support vector machines," Adv. Multimedia Ubiquitous Eng.. 393, , 389-395 (2016).*

(Continued)

*Primary Examiner* — Bhavesh Mehta
*Assistant Examiner* — Ian Lemieux
(74) *Attorney, Agent, or Firm* — Athorus, PLLC

(57) ABSTRACT

Image classification and related imaging tasks performed using machine learning tools may be accelerated by using one or more of such tools to associate an image with a cluster of such labels or categories, and then to select one of the labels or categories of the cluster as associated with the image. The clusters of labels or categories may comprise labels that are mutually confused for one another, e.g., two or more labels or categories that have been identified as associated with a single image. By defining clusters of labels or categories, and configuring a machine learning tool to associate an image with one of the clusters, processes for identifying labels or categories associated with images may be accelerated because computations associated with labels or categories not included in the cluster may be omitted.

20 Claims, 15 Drawing Sheets

(56) References Cited

U.S. PATENT DOCUMENTS

2016/0153466 A1* 6/2016 Ress, Jr. .............. F01D 17/162
 415/1
2016/0217344 A1* 7/2016 Misra .................. G06K 9/6227

OTHER PUBLICATIONS

I. Färber, S. Günnemann, H.-P. Kriegel, P. Kröger, E. Müller, E. Schubert, T. Seidl, and A. Zimek, "On using class-labels in evaluation of clusterings," In MultiClust: 1st International Workshop on Discovering, Summarizing and Using Multiple Clusterings Held in Conjunction with KDD 2010, Washington, DC (2010).*

* cited by examiner

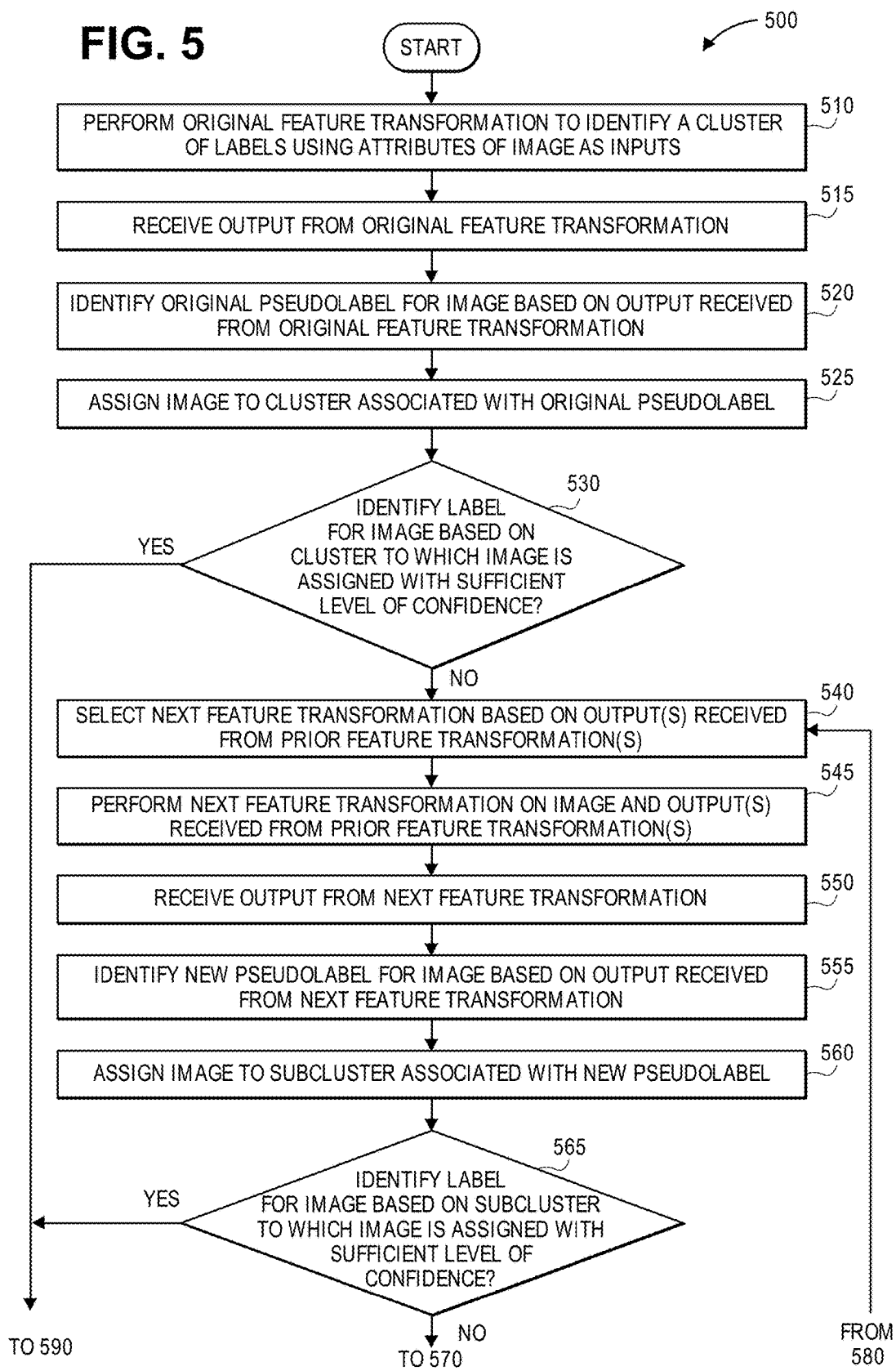

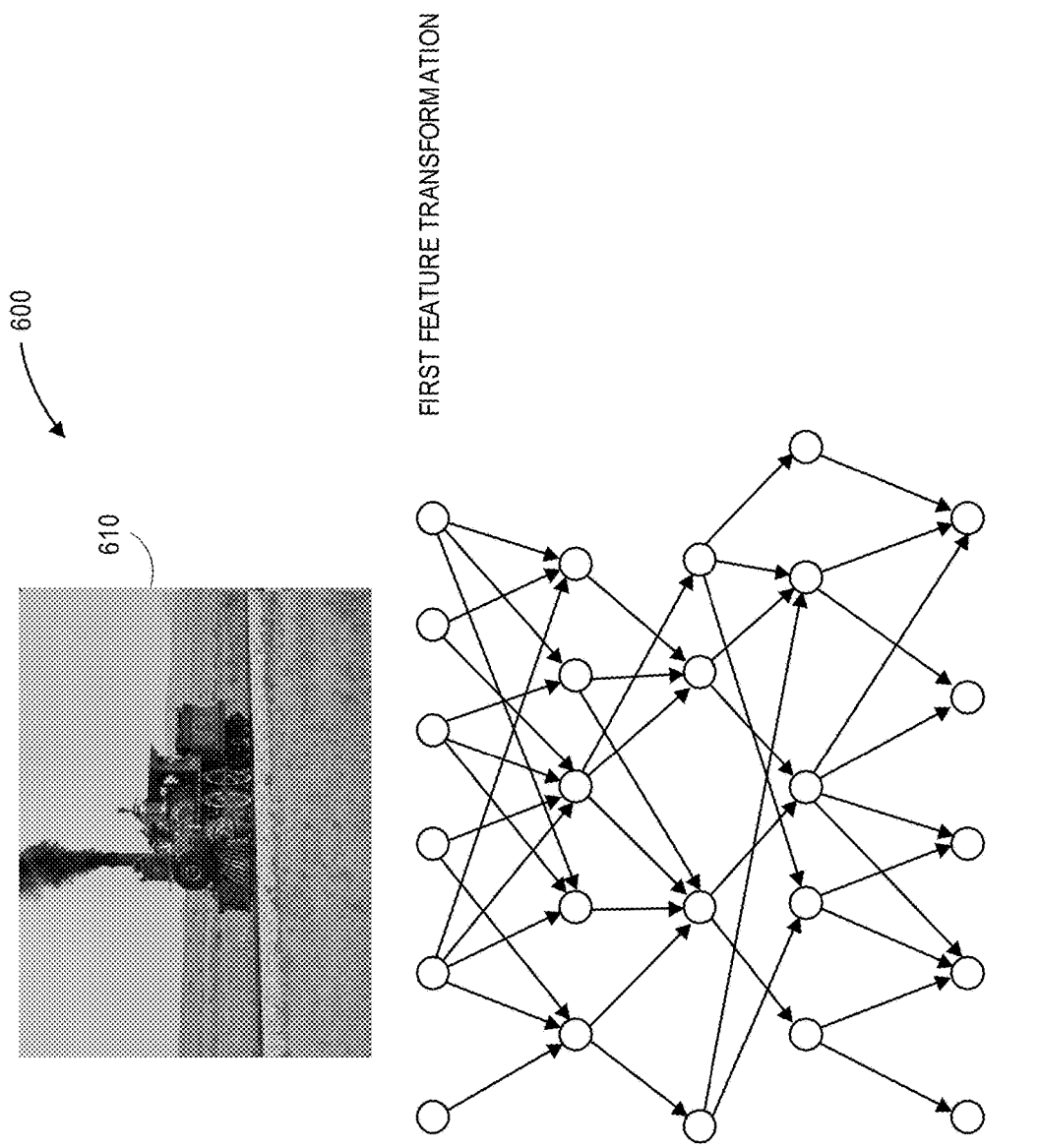

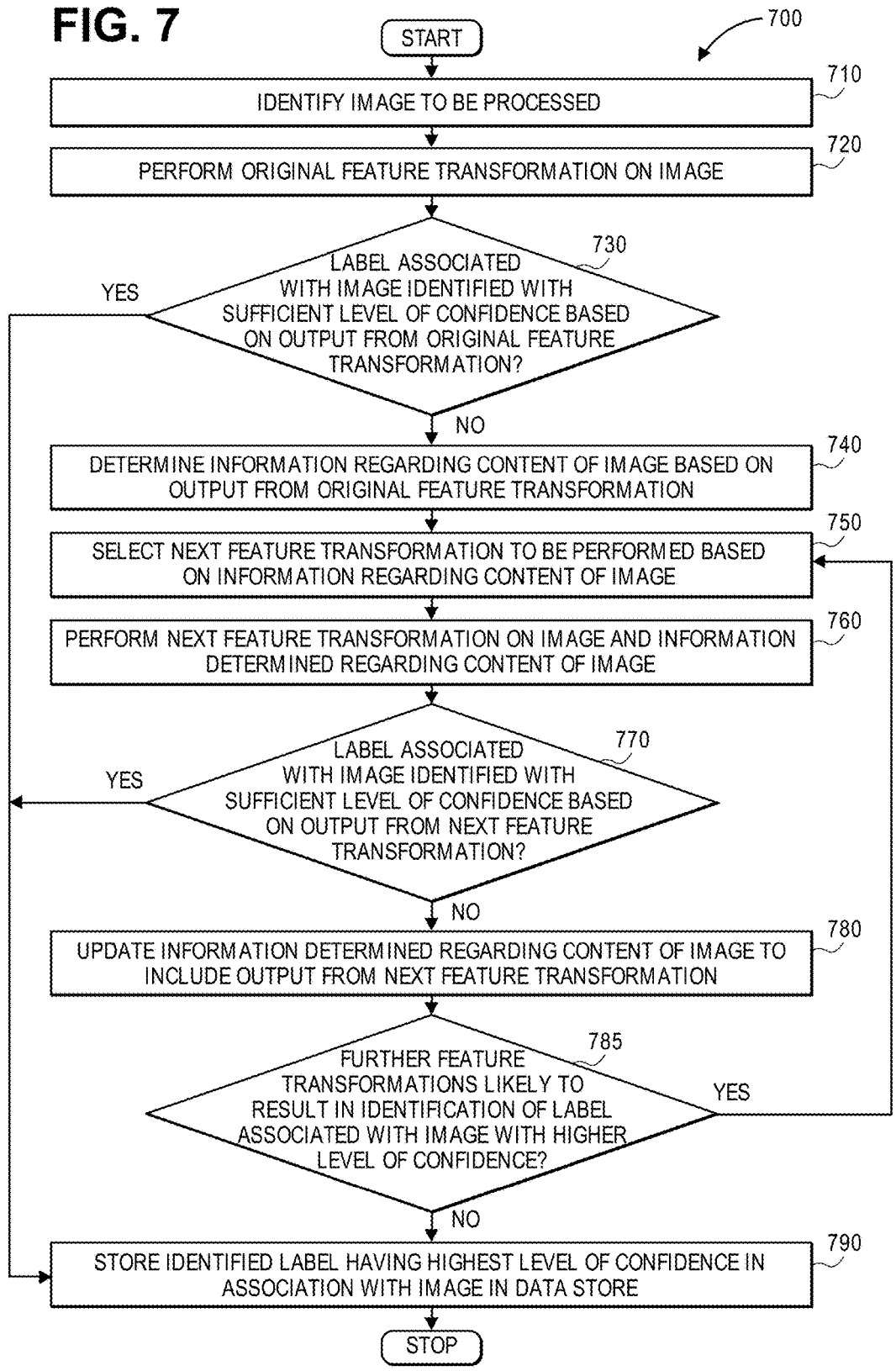

CLUSTER-TRAINED MACHINE LEARNING FOR IMAGE PROCESSING

BACKGROUND

Artificial neural networks, especially deep neural networks (e.g., artificial neural networks having an input layer, an output layer, and two or more hidden layers of nodes between the input layer and the output layer), are commonly utilized in image processing applications. For example, in an image processing application, a deep neural network may execute image processing steps at each of any number of hidden layers, and may be thereby utilized to perform any number of functions, including image classification, object recognition, image labeling, facial recognition or character or image recognition functions, or others. Depending on their size or depth, artificial neural networks may effectively identify and analyze image content with a level of confidence or accuracy that matches or surpasses those of other known methods.

Artificial neural networks may be reliably utilized in any number of image processing applications. However, performing image processing applications using artificial neural networks may be computationally expensive as compared to other machine learning tools or methods that may be utilized to perform such applications, as artificial neural networks typically consume substantially large portions of available processing power, memory and/or other computing resources. Typically, a level of confidence or accuracy in outputs provided by artificial neural networks performing imaging tasks is a function of the number of calculations performed thereby. An image analysis performed using a traditional deep neural network may require a predetermined number of calculations or computations associated with each of the nodes of each of the hidden layers of the network. Therefore, while networks having larger numbers of hidden layers and nodes may perform intended tasks with a greater degree of accuracy than networks having fewer layers or nodes, more complex networks may require longer periods of time in order to complete such tasks than less complex networks. A decision to use artificial neural networks in processing images commonly includes an inherent choice between accuracy and efficiency, or between greater confidence and fewer computational resources.

BRIEF DESCRIPTION OF THE DRAWINGS

FIGS. 6A through 6F are views of aspects of one image processing system in accordance with embodiments of the present disclosure.

FIG. 7 is a flow chart of one process for processing imaging data in accordance with embodiments of the present disclosure.

DETAILED DESCRIPTION

Figure 1A:
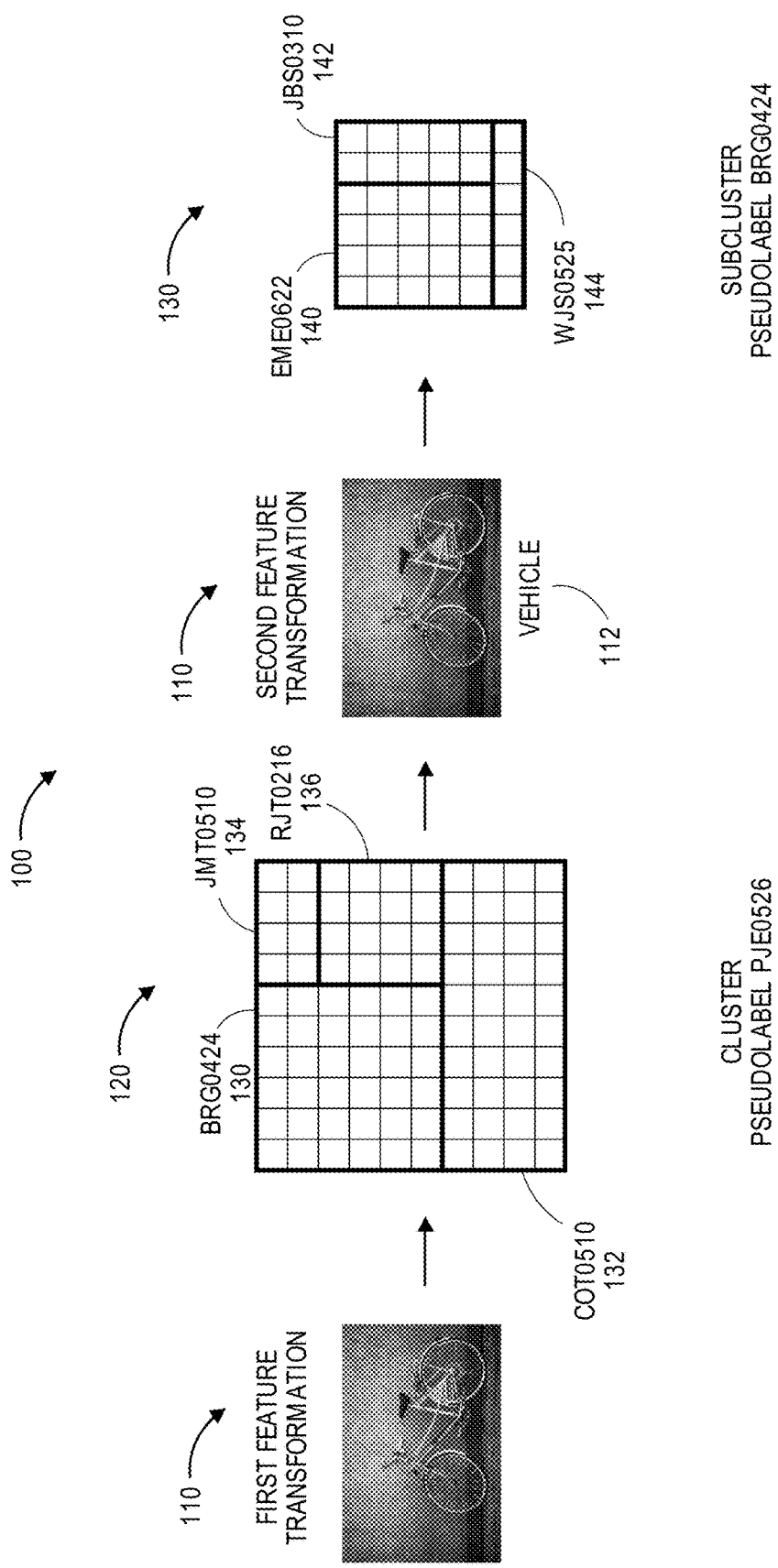
FIGS. 1A, 1B and 1C are views of aspects of an image processing system in accordance with embodiments of the present disclosure.

As is set forth in greater detail below, the present disclosure is directed to image processing using artificial neural networks or other machine learning tools (e.g., classifiers or other machine learning algorithms or systems). More specifically, the systems and methods disclosed herein are directed to accelerating the performance of image processing applications using artificial neural networks or other machine learning tools by reducing the number of computations to be performed by such networks or tools in a manner that maintains their respective levels of accuracy.

According to some embodiments of the present disclosure, in a first training evolution, a training set comprising images and labels (e.g., categories associated with the images) may be provided to a first machine learning tool, such as an artificial neural network, as training inputs. The first machine learning tool may be configured to perform a feature transformation pertaining to a specific task, e.g., an image processing task such as an image classification, object recognition, image labeling, facial recognition or character recognition function. Training outputs generated by the first machine learning tool in response to the training inputs may be clustered into groups or clusters of mutual confusion. For example, where an image is provided as a part of a training set to a first machine learning tool configured to perform an image classification function, each of the labels or categories returned by the first machine learning tool as training outputs, e.g., each of the labels or categories identified by the first machine learning tool as being potentially associated with the image, may be grouped together into a cluster. The cluster may include the label or category actually associated with the image, as well as any other labels or categories with which the image is most commonly confused.

Subsequently, another label or category, e.g., an alternate label such as a "pseudolabel," may be applied to the cluster of labels or categories, and thereby assigned to each of the images associated with one of the labels or in one of the categories of the cluster. Thereafter, a second machine learning tool may be trained to associate images with a single pseudolabel of a cluster of labels or categories with which the images are most commonly associated, e.g., by providing a second training set comprising images and pseudolabels to the second machine learning tool as training inputs. Once the second machine learning tool is fully trained to associate the images of the second training set with their respective pseudolabels, the second machine learning tool may be utilized to associate other images with one of a plurality of pseudolabels. In this regard, the second machine learning tool may reduce the number of computations required in order to identify a limited subset of labels or categories, e.g., a cluster of such labels or categories, with which an image may be associated.

Moreover, the process of clustering labels or categories of images and training machine learning tools to associate images with such clusters may be performed on multiple occasions or at multiple levels, such that subclusters of labels or categories may be defined within clusters, or sub-subclusters of labels or categories may be defined within subclusters, and so on and so forth, each of which may be labeled with a respective pseudolabel. Machine learning tools may thus be trained to associate images within a cluster with a pseudolabel of a specific subcluster, and images within the subcluster with a pseudolabel of a specific sub-subcluster.

Figure 1B:
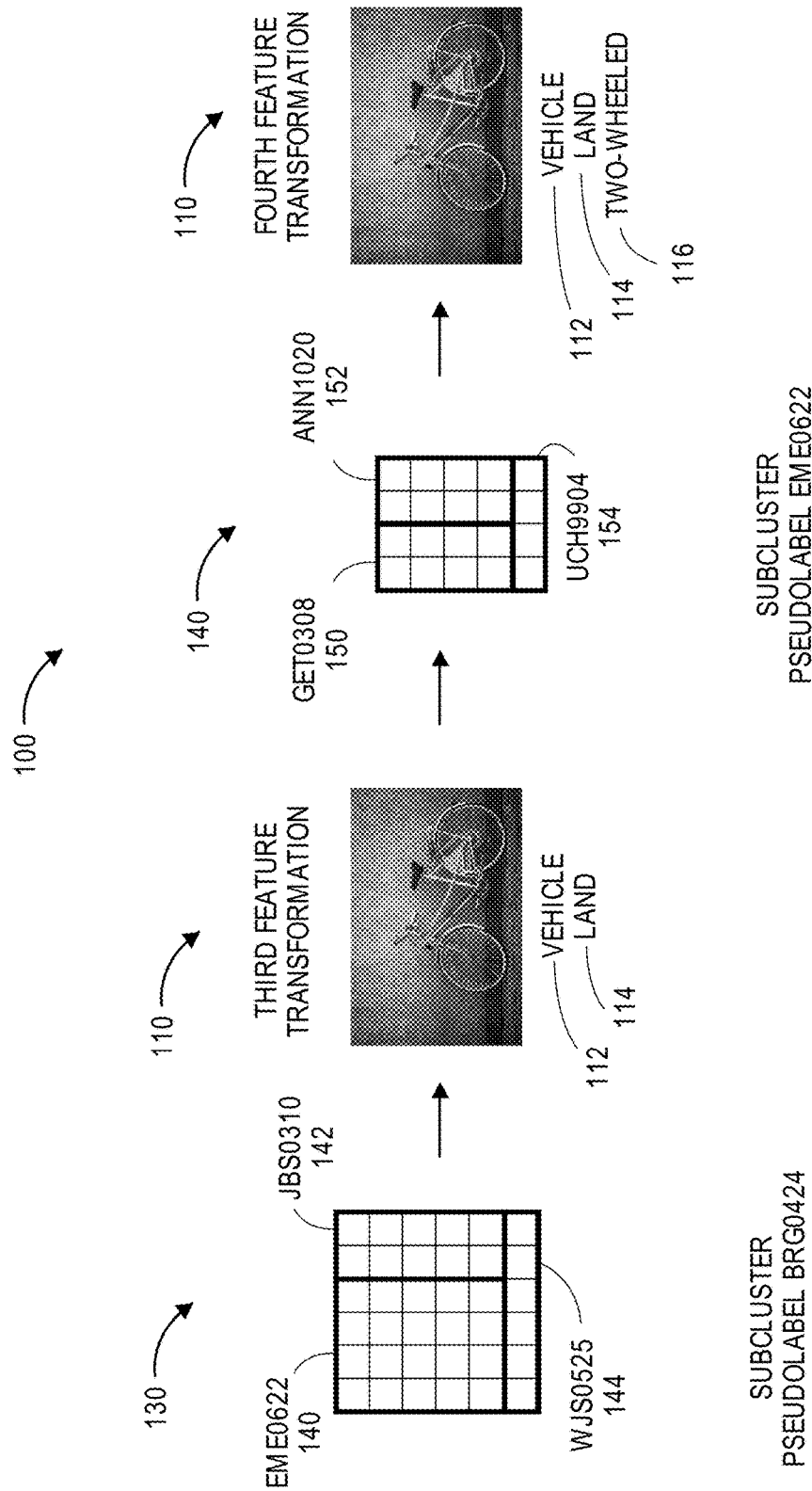
Figure 1C:
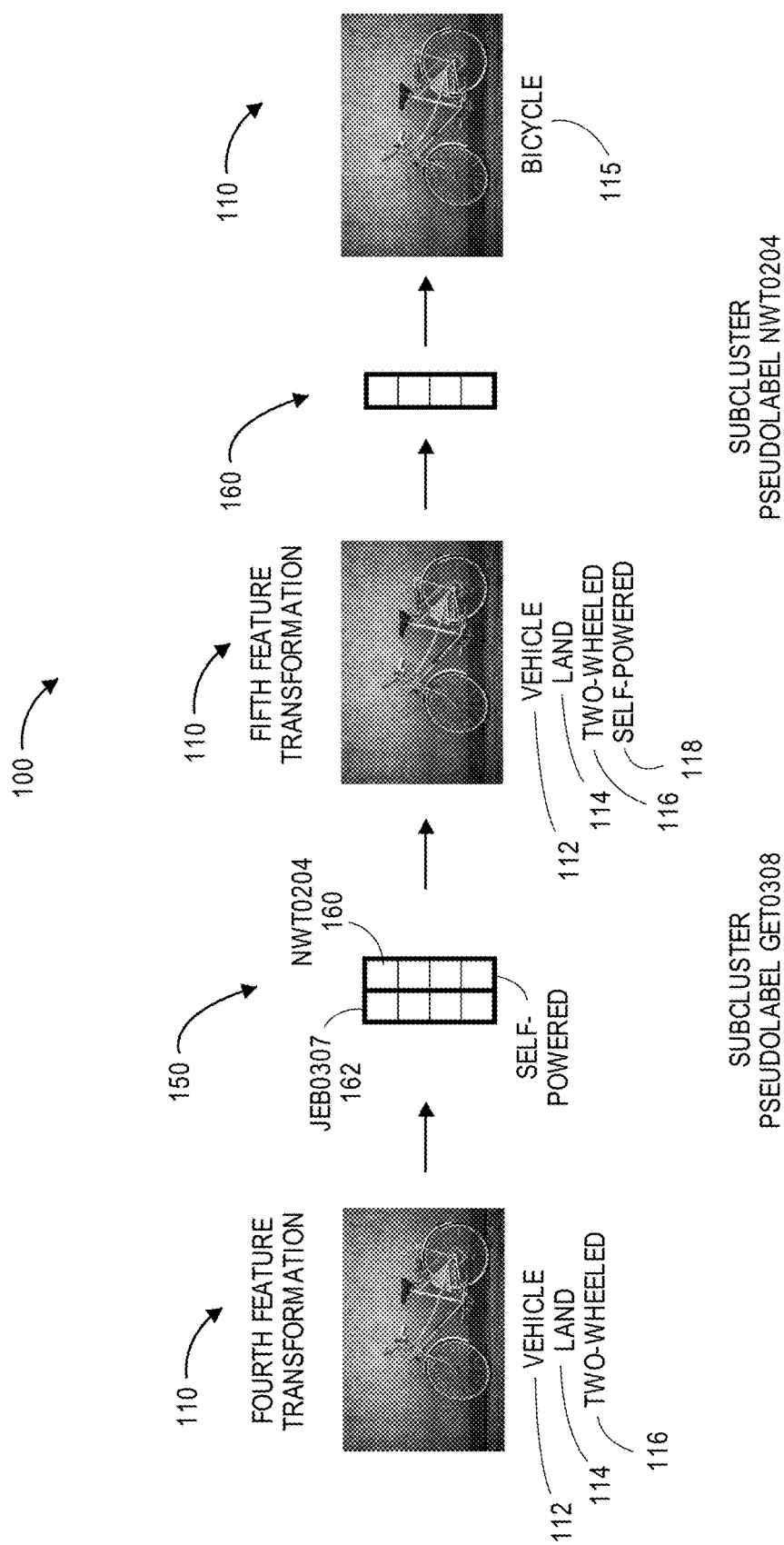

Referring to FIGS. 1A, 1B and 1C, an image processing system 100 for processing an image 110 is shown. The system 100 may utilize a convolutional neural network, a classifier or another machine learning tool to identify a label 115 with which the image 110 is most closely associated. As is shown in FIG. 1A, the image 110 may be subjected to a first feature transformation, or a discrete set of processing calculations or computations. As a result of the first feature transformation, the image 110 is identified as associated with a cluster 120 having a first pseudolabel, viz., PJE0526, and a general attribute 112 of the image 110, e.g., that the image 110 includes a vehicle, may be determined. The first feature transformation may be performed on any type or form of computing device, including but not limited to one or more computing devices or processors residing on an imaging device such as a digital camera, or by two or more distributed computing devices having processors, one of which may reside on the imaging device. The cluster 120 is defined through a training process, and includes a plurality of labels or categories with which an image may be associated, which may include the particular label or category associated with the image, and one or more other labels or categories with which the image is most commonly and mistakenly identified as associated with the image 110. As is shown in FIG. 1A, the labels or categories of the cluster 120 are identified as being commonly confused with one another, and are not defined according to any semantic hierarchy, or according to any discrete instructions. For example, the cluster 120 may include labels associated with images of vehicles, structures, animals or machines, which may have little in common but are visually similar to one another in at least one respect.

The first feature transformation may be any set of calculations or computations affecting or regarding information or data regarding the image 110, including one or more calculations or sets of calculations associated with an image processing application or operation. Likewise, the first pseudolabel may be any arbitrary or synthetic identifier assigned to the cluster 120 of labels or categories, and may be selected on any basis, e.g., based on features or attributes of one or more of the specific labels or categories included therein, or at random.

If the label 115 of the image 110 may not be identified to a sufficiently high degree of confidence based on the cluster 120, e.g., if the attribute 112 of the image 110 does not adequately or sufficiently describe the content of the image 110, the image 110 may be subjected to a second feature transformation, or a second discrete set of processing calculations or computations. The second feature transformation may consider not only the image 110 but also the cluster 120, the first pseudolabel and any attributes 112 identified as a result of the first feature transformation to identify one of a plurality of subclusters 130, 132, 134, 136 of labels or categories within the cluster 120 with which the image 110 is most closely associated. As a result of the second feature transformation, the image 110 may be identified as associated with the subcluster 130 having a second pseudolabel, viz., BRG0424, and a general attribute 114 of the image 110 (viz., "land") may be determined. The subcluster 130 is defined through a training process that may be the same process that was used to define the cluster 120, or a different training process. As with the cluster 120, the subcluster 130 need not be defined according to any semantic hierarchy, or according to any discrete instructions. The subcluster 130 may include a subset of the plurality of labels or categories of the cluster 120, e.g., a plurality of labels or categories with which the image is most commonly and mistakenly identified as associated with one another, and are not defined according to any semantic hierarchy, or according to any discrete instructions. For example, as is shown in FIG. 1A, the second feature transformation may determine a subset of the labels or categories of the cluster 120 with which the image 110 is most likely associated, and the subcluster 130 may be identified thereby.

If the label 115 of the image 110 may not be identified to a sufficiently high degree of confidence based on the subcluster 130, e.g., if the attributes 112, 114 of the image 110 do not adequately or sufficiently describe the content of the image 110, the image 110 may be subjected to a third feature transformation that considers not only the image 110, the subcluster 130 and the second pseudolabel but also the attributes 112, 114. As a result of the third feature transformation, the image 110 may be identified as associated with a subcluster 140 having a third pseudolabel, viz., EME0622, and an attribute 116 of the image 110 (viz., "two-wheeled") may be determined. If a label or category for the image 110 may not be identified to a sufficiently high degree of confidence based on the subcluster 140 or the attributes 112, 114, 116, e.g., if the attributes 112, 114, 116 of the image 110 do not adequately or sufficiently describe the content of the image 110, the image 110 may be subjected to a fourth feature transformation which may consider not only the image 110, the subcluster 140 and the third pseudolabel but also the attributes 112, 114, 116.

As a result of the fourth feature transformation, the image 110 may be identified as associated with a subcluster 150 having a fourth pseudolabel, viz., GET0308, and an attribute 118 of the image 110 (viz., "self-powered") may be determined. If a label or category for the image 110 may not be identified to a sufficiently high degree of confidence based on the subcluster 150 or the attributes 112, 114, 116, 118, the image 110 may be subjected to a fifth feature transformation which may consider not only the image 110, the fourth pseudolabel and the subcluster 150 but also the attributes 112, 114, 116, 118. As a result of the fifth feature transformation, the image 110 may be identified as associated with a subcluster 160 having a fifth pseudolabel, viz., NWT0204. As is shown in FIG. 1C, based on the subcluster 160 and/or the attributes 112, 114, 116, 118, the label 115 for the image is identified, viz., "bicycle."

Accordingly, some embodiments of the present disclosure may accelerate traditional techniques for classifying images or processing imaging data using machine learning systems or algorithms, such as artificial neural networks or other classifiers, by training such systems or algorithms to associate images with clusters of labels or categories, e.g., to identify pseudolabels assigned to such clusters, rather than individual labels or categories, thereby narrowing the number of computations required in order to associate such images with a label or category. After an image has been associated with a cluster of labels or categories, an individual label or category may be identified as associated with the image on any basis.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Computer vision algorithms or other machine learning algorithms may be operated on computer devices of various sizes or types, including but not limited to smartphones or other cell phones, tablets, video cameras or other computer-based machines. Such mobile devices may have limited available computer resources, e.g., network bandwidth, storage capacity or processing power, as compared to larger or more complex computer devices. Therefore, executing computer vision algorithms or other machine learning algorithms, on such devices may occupy all or much of the available resources, without any guarantee, or even a reasonable assurance, that the execution of such algorithms will be successful. For example, processing a digital photograph captured by a user of a smartphone or tablet according to one or more algorithms in order to geolocate the user based on the contents of the digital photograph may be an ineffective use of the limited resources that are available on the smartphone or tablet. Generally speaking, the execution of an algorithm configured to produce an output based on an input, without confidence that the algorithm can produce a reliable and accurate result based on the input, is often a waste of computing power, memory storage or time, particularly on a computing device on which power, storage and time are limited.

Machine learning tools, such as artificial neural networks, have been utilized to identify relations between respective elements of apparently unrelated sets of data. An artificial neural network is a parallel distributed computing processor comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses have been utilized in image processing applications.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive an input and generate an output in accordance with an activation or energy function, with parameters corresponding to the various strengths or synaptic weights. Likewise, each of the neurons within a network may be understood to have different activation or energy functions; in this regard, such a network may be dubbed a heterogeneous neural network. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information specifically flows in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize the error in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate an image with a label, a category, a cluster or a pseudolabel thereof, to within an acceptable tolerance, an input in the form of an image may be provided to the trained network, and a label, a category, a cluster or a pseudolabel may be identified based on the output thereof.

The systems and methods of the present disclosure are directed to reducing a number of computations required in order to process imaging data, or increasing the efficiency with which such imaging data is processed, by utilizing machine learning tools (e.g., artificial neural networks) that are trained to associate imaging data with clusters of labels or categories, or with pseudolabels that are associated with such clusters. Some embodiments of the present disclosure may operate by identifying clusters of labels or categories of images that are mistakenly confused with one another. When such clusters are identified, an alternate label, or pseudolabel, may be assigned to the cluster. A machine learning tool may be trained to associate images with a cluster, or with the pseudolabel assigned to the cluster. Subsequently, when information or data regarding an image is provided to the trained machine learning tool as an input or inputs, a cluster with which the image is most likely associated may be identified based on an output or outputs received from the machine learning tool, thereby coarsely filtering the steps or computations required in order to classify an image with a single label or category by removing labels or categories not included in (e.g., outside of) the cluster from consideration at the earliest stages.

Moreover, the processes of training machine learning tools to associate images with clusters of labels or categories, and identifying a cluster of labels or categories associated with an image using a trained machine learning tool, may be performed or repeated for any number of times or iterations, e.g., for any number of levels of sub-categories within a category, until a label or category is identified at a sufficiently high degree of confidence. The machine learning tool utilized to identify the cluster or the pseudolabel associated therewith may be selected on any basis with regard to the attributes of the images, and according to any criteria, including but not limited to the available processing power, memory or storage on one or more computing devices, or processing times that may be required in order to utilize the machine learning tool on the images, or the likelihood that utilizing the machine learning tool on the imaging data will successfully achieve a desired result.

In accordance with the present disclosure, clusters may be defined without regard to any semantic hierarchy. In this regard, there is no need to explain to a machine learning tool why specific labels or categories for images are commonly associated with one another or frequently and mistakenly applied to common sets of images, and no common attribute of such images, labels or categories need be provided. Rather, a machine learning tool may simply determine, for example, that images of rockets (e.g., images of the Saturn V rocket) and images of monuments or other iconic buildings (e.g., images of Seattle's Space Needle or Hartford's Travelers Building) are commonly associated with one another, or that labels of "monument" are frequently applied to images of rockets and that labels of "rocket" are frequently applied to images of monuments. Once such a determination is made, a cluster including labels of "rocket" or like labels, and labels of "monument" or like labels, may be defined by a machine learning tool (e.g., a machine learning system or algorithm), which may autonomously define or discover a hierarchy associated with the labels of the cluster.

For example, where a set of training images is provided to a machine learning tool as inputs, a cluster of mutual confusion may be defined based on outputs received from the machine learning tool that indicate instances of confusion or misapplication of labels to such images in excess of a particular threshold. The outputs may identify labels or categories associated with an image, and percentages, probabilities or other measures of likelihoods that such labels or categories will be associated with such images, and the labels or categories having percentages, probabilities or other measures that exceed a particular threshold may be deemed part of a common cluster.

In accordance with the present disclosure, a pseudolabel of a cluster may be any combination of letters, numbers or symbols determined or selected on any basis. For example, the pseudolabel may be selected based on any of the labels or categories included in the cluster, and may bear some or no relation to such labels or categories, or the images associated with such labels or categories. Alternatively, the pseudolabels of the present disclosure may be selected at random. Once a pseudolabel has been selected for a cluster of labels or categories, the pseudolabel may be assigned to or affiliated with each of the labels or categories within the cluster, and with each of the images in one or more of such labels or categories.

Additionally, in accordance with the present disclosure, a cluster may have any number of subclusters included therein. Such subclusters may include subsets of the labels or categories of the cluster that have been determined to be commonly associated with one another or frequently and mistakenly applied to common sets of images, e.g., with probabilities of association or co-occurrences that may exceed the general probabilities of association or co-occurrences of the category at large. Thus, after an image has been provided as an input to a trained machine learning tool (e.g., a classifier) and identified as being associated with a cluster based on an output received from the trained machine learning tool, the image may be further associated with a subcluster of labels or categories of the cluster by providing the image, along with one or more attributes of the image or the cluster, or any other associated information, data or metadata, to a trained machine learning tool as an input, and identifying the subcluster based on an output received from the trained machine learning tool. The subcluster may be identified using the same trained machine learning tool that was utilized to identify the cluster, or a different trained machine learning tool (e.g., first and second classifiers). The process of identifying clusters of labels or categories, or subclusters of labels or categories within such clusters, may be repeated as necessary until a single label or category is identified as being associated with the image to at least a predetermined degree of confidence.

Moreover, after an image is identified as being associated with a cluster of labels or categories in accordance with the present disclosure, a specific label or category associated with the image may be identified by any technique. For example, a full analysis of the contents of the image may be performed using any type or form of machine learning system, armed with the knowledge the label or category most appropriately assigned to the image is one of a plurality of labels or categories included in the cluster. Furthermore, in some embodiments, knowledge that an image is associated with one of the labels or categories in a cluster may be sufficient, either alone or in combination with other information or data regarding the image or a context with which the image is associated, to identify a single label or category most appropriately assigned to the image.

Accordingly, by training a machine learning tool, such as an artificial neural network or a classifier, to recognize dominant features in a set of data regarding an image and to associate the image with a cluster of labels or categories, or a pseudolabel thereof, the systems and methods disclosed herein may be used to identify a label or a category most closely associated with the image more rapidly and efficiently than traditional methods. Associating an image with a cluster of labels or categories obviates the need to consider whether the image is associated with labels or categories not included in the cluster, thereby reducing the processing power, memory or storage on one or more computing devices, or processing times that may be required in order to identify a single label or category with which the image is associated, and increasing the likelihood that machine learning systems or methods subsequently utilized to evaluate the image will successfully achieve a desired result. Moreover, once an image has been identified as associated with a cluster of labels or categories, the single label or category with which the image is associated may be identified by any technique.

Figure 2:
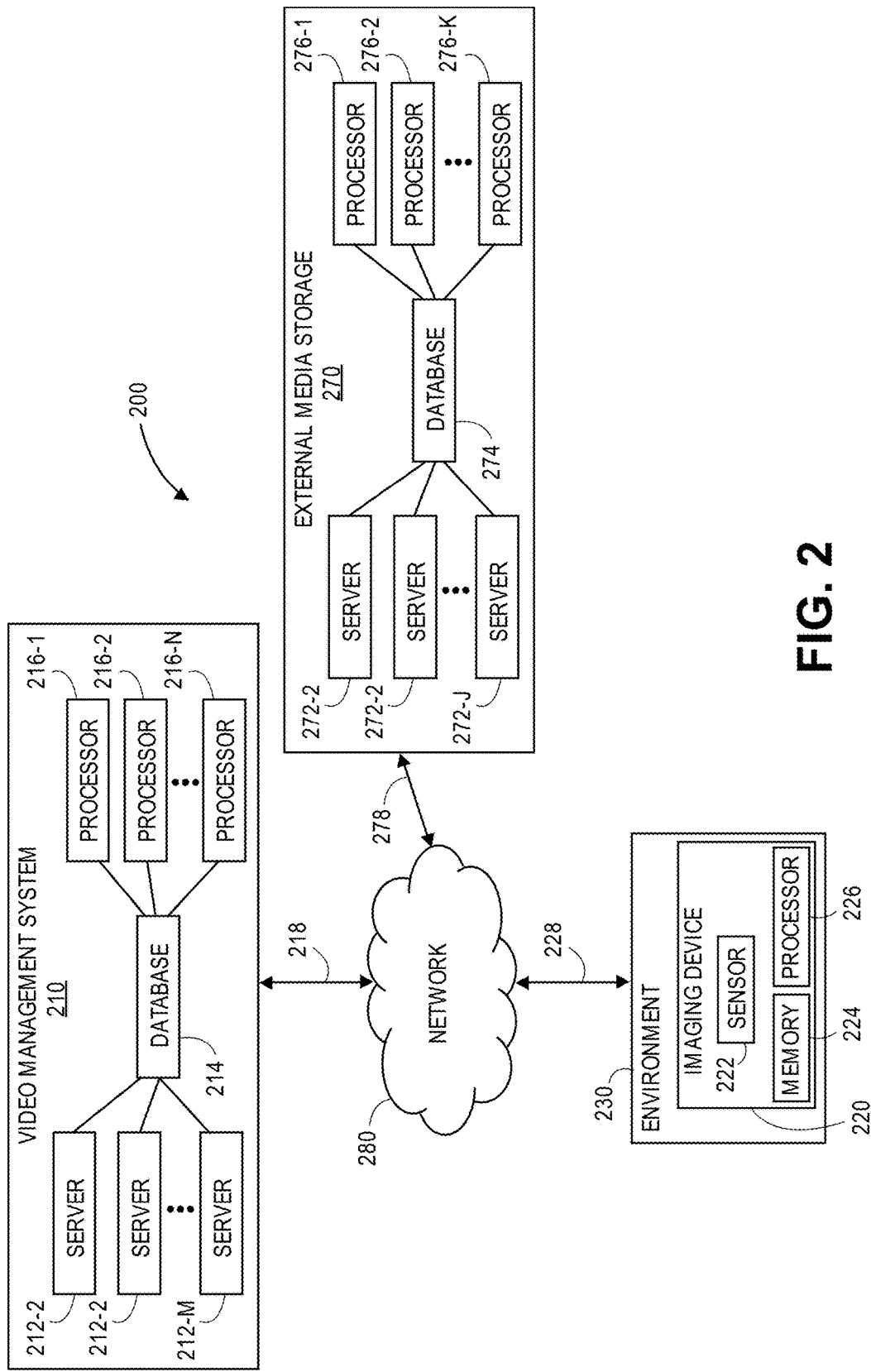
FIG. 2 is a block diagram of components of an image processing system in accordance with embodiments of the present disclosure.

Referring to FIG. 2, a block diagram of components of one image processing system 200 in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in the system 100 of FIGS. 1A through 1C.

The system 200 of FIG. 2 includes a video management system 210, an imaging device 220 provided in an environment 230, and an external media storage facility 270 connected to one another across a network 280, such as the Internet.

The video management system 210 of FIG. 2 includes m physical computer servers 212-1, 212-2 . . . 212-m having one or more databases (or data stores) 214 associated therewith, as well as n computer processors 216-1, 216-2 . . . 216-n provided for any specific or general purpose. For example, the video management system 210 of FIG. 2 may be independently provided for the exclusive purpose of managing the monitoring of video files or other imaging data captured by the imaging device 220 or, alternatively, provided in connection with one or more physical or virtual services configured to manage or monitor such files, as well as one or more other functions. The servers 212-1, 212-2 . . . 212-m may be connected to or otherwise communicate with the databases 214 and the processors 216-1, 216-2 . . . 216-n. The databases 214 may store any type of information or data, including digital media files or any like files containing multimedia (e.g., audio and/or video content), for any purpose. The servers 212-1, 212-2 . . . 212-m and/or the computer processors 216-1, 216-2 . . . 216-n may also connect to or otherwise communicate with the network 280, as indicated by line 218, through the sending and receiving of digital data.

The imaging device 220 may comprise any form of optical recording sensor or device that may be used to photograph or otherwise record information or data regarding activities occurring within one or more areas or regions of the environment 230, or for any other purpose. As is shown in FIG. 2, the imaging device 220 is connected to the network 280 and includes one or more sensors 222, one or more memory or storage components 224 (e.g., a database or another data store), one or more processors 226, and any other components that may be required in order to capture, analyze and/or store imaging data from within the environment 230 in which the imaging device 220 is provided. For example, the imaging device 220 may capture one or more still or moving images, along with any relevant audio signals or other information, and may also connect to or otherwise communicate with one another, or with the network 280, as indicated by the line 228, through the sending and receiving of digital data. Although the system 200 shown in FIG. 2 includes just one imaging device 220 therein, provided in a single environment 230, any number or type of imaging devices or sensors may be provided within any number of environments in accordance with the present disclosure.

The environment 230 may be any facilities, stations or locations within which the imaging device 220 may be installed and provided for performing monitoring and/or surveillance of activities occurring therein. According to one embodiment, the environment 230 may include a fulfillment center, a warehouse or other like facility; a financial institution, such as a bank or trading floor; a transportation hub or station, such as an airport, a train station or a bus station; or a stadium, a theater, a shopping center or another large-scale venue; or portions thereof. Those of ordinary skill in the pertinent art will recognize that the systems and methods of the present disclosure are not limited by any activities that may be performed or functions that may be provided by the environment 230.

The environment 230 may further include one or more workers or staff members (not shown) who may conduct one or more operations within the environment 230, e.g., handling or transporting one or more items within a fulfillment center, a warehouse or other like facility; receiving or disbursing funds in a financial institution, such as a bank or trading floor; arriving at or departing from a transportation hub or station, such as an airport, a train station or a bus station, as well as a stadium, a theater, a shopping center or another large-scale venue. Such workers may operate one or more computing devices or machines, e.g., a general purpose device such a personal digital assistant, a digital media player, a smartphone, a tablet computer, a desktop computer or a laptop computer, which may include any form of input and/or output peripherals such as scanners, readers, keyboards, keypads, touchscreens or like devices. Additionally, such workers may operate tools or other implements for handling or transporting items within the environment 230, such as by removing the items from a car, truck, ship or aircraft, placing the items onto a crane, jack, belt or another conveying apparatus at a receiving station, transporting the items to a shelf, bin, rack, tier, bar, hook or other storage means within a storage area, retrieving the items from such a storage means within the storage area, transporting the items to a defined region within a distribution station, and preparing the items for delivery to one or more customers.

The environment 230 may further include any number of objects such as items, structural features, facilities, vehicles, tools, implements, surfaces or pieces of equipment, or any other objects, people or other entities from which imaging data or other information or data may be captured. Such entities may have any size, shape, mass, volume, surface area, texture, color, reflectance, silhouette, surface contour or variations, or any other qualities in accordance with the present disclosure. For example, where the environment 230 comprises all or a portion of a fulfillment center, the environment 230 may include one or more receiving stations featuring any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers.

The environment 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The environment 230 may further include one or more distribution stations where items that have been retrieved from a designated storage area may be evaluated, prepared and packed for delivery from the environment 230 to addresses, locations or destinations specified by customers, also by way of carriers such as cars, trucks, trailers, freight cars, container ships or cargo aircraft (e.g., manned aircraft or unmanned aircraft, such as drones).

The environment 230 may further include one or more order processing and/or communication systems using computer devices in communication with one or more of the servers 212-1, 212-2 . . . 212-*m*, the database 214 and/or the processors 216-1, 216-2 . . . 216-*n* of the video management system 210, the processor 226 of the imaging device 220 within the environment 230, or servers 272-1, 272-2 . . . 272-*j*, databases 274 and/or processors 276-1, 276-2 . . . 276-*k* of the external media storage facility 270, or through one or more other computing devices or machines that may be connected to the network 280, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding operations within the environment 230 or the interactions received from the one or more operators, users or workers.

Moreover, the environment 230 may further include one or more control systems that may generate instructions for conducting operations therein. Such control systems may be in communication with the processor 226 or other components of the imaging device 220, one or more workers (not shown), or any other computer systems, objects or machinery operated therein. For example, such control systems may be associated with one or more other computing devices or machines, and may communicate with the video management system 210, the external media storage facility 270 or one or more other computer devices (not shown) over the network 280, through the sending and receiving of digital data.

The external media storage facility 270 may be any facility, station or location having the ability or capacity to receive and store information or data, such as digital media files, in one or more data stores, e.g., digital media files received from the video management system 210, one or more of the imaging device 220 or the environment 230. As is shown in FIG. 2, the external media storage facility 270 includes j physical computer servers 272-1, 272-2 . . . 272-*j* having one or more databases 274 associated therewith, as well as k computer processors 276-1, 276-2 . . . 276-*k*. The servers 272-1, 272-2 . . . 272-*j* may be connected to or otherwise communicate with the databases 274 and the processors 276-1, 276-2 . . . 276-*k*. The databases 274 may store any type of information or data, including digital media files or any like files containing multimedia (e.g., audio and/or video content), for any purpose. The servers 272-1, 272-2 . . . 272-*j* and/or the computer processors 276-1, 276-2 . . . 276-*k* may also connect to or otherwise communicate with the network 280, as indicated by line 278, through the sending and receiving of digital data.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The video management system 210, the monitored environment 230 or the external media storage facility 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the servers 212-1, 212-2 . . . 212-m may be adapted to transmit information or data in the form of synchronous or asynchronous messages from the video management system 210 to the processor 226 or other components of the imaging device 220 within the environment 230, or any other computer device in real time or in near-real time, or in one or more offline processes, via the network 280. Those of ordinary skill in the pertinent art would recognize that the video management system 210, the environment 230 or the external media storage facility 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212-1, 212-2 . . . 212-m, the processor 226, the servers 272-1, 272-2 . . . 272-j, or any other computers or control systems utilized by the video management system 210, or the external media storage facility 270, or within the environment 230, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
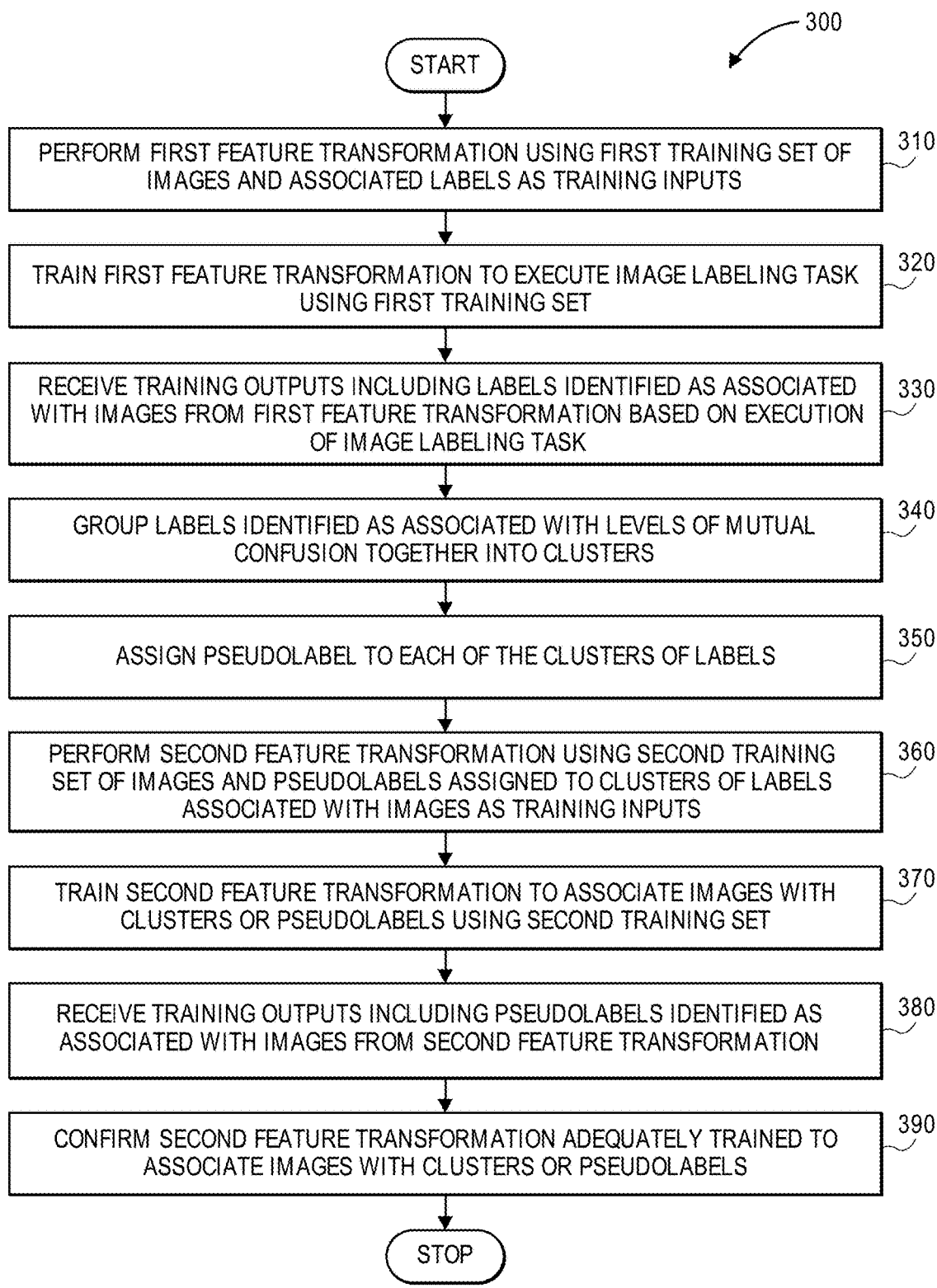
FIG. 3 is a flow chart of one process for processing imaging data in accordance with embodiments of the present disclosure.

As is discussed above, the systems and methods of the present disclosure may be directed to training machine learning tools (e.g., neural networks, classifiers or other algorithms or systems) utilized in image processing applications to associate images with clusters of labels or categories, thereby simplifying the process by which such images may be ultimately associated with a single label or category. Referring to FIG. 3, a flow chart 300 representing one embodiment of a process for processing imaging data in accordance with the present disclosure is shown. At box 310, a first feature transformation is performed using a first training set of images and labels associated with such images as training inputs. The images may include any type or form of imaging data (e.g., color images or black-and-white images, as well as depth images, radiographic images, infrared images, or any other optical representation), and the labels may represent any categories with which such images or the contents thereof may be associated, or the descriptors or identifiers of such contents. Any type or form of machine learning tool may be used to perform the first feature transformation, including but not limited to an artificial neural network or any type of classifier.

At box 320, the first feature transformation is trained to execute an image labeling task using the first training set. The image labeling task may be any type or form of labeling or classification functions or operations including, but not limited to, character recognition, edge detection, image compression, image correction, image filtering, image modeling, image noise reduction, image quantization, image sampling, image scaling, image segmentation, image sharpening, image smoothing, image transformation, image zooming or object recognition functions or operations. At box 330, training outputs including labels identified as associated with the respective images are received from the first feature transformation based on the execution of the image labeling task. Alternatively, or additionally, the training of the first feature transformation may be evaluated or confirmed with the use of one or more test sets of images and known labels or categories, with the images of the test set being provided to the first feature transformation as inputs, and the outputs being compared to the known labels or categories to determine the adequacy or the extent to which the first feature transformation has been properly trained.

At box 340, the labels identified as associated with the images at levels of mutual confusion are identified and grouped into clusters. For example, where a plurality of images of Siberian huskies are provided to the first feature transformation as inputs, the outputs received from the first feature transformation in response to the images of the Siberian huskies may include not only labels of "Siberian husky," but also labels of "Samoyed," "wolf" or "coyote," or any other labels. Similarly, where a plurality of images of wolves are provided to the first feature transformation as inputs, the outputs received from the first feature transformation in response to such images may include not only labels of "wolf" but also labels of "coyote," "husky" or "werewolf" The labels returned from the first feature transformation to non-negligible extents may subsequently be identified, and grouped into a single cluster corresponding to labels that have been mutually confused for one another.

At box 350, pseudolabels, e.g., alternate labels that cover, encompass or describe the labels or categories of mutual confusion that have been grouped together, are assigned to each of the clusters identified at box 340. Such pseudolabels may identify or represent one or more of the specific labels or categories within the clusters, or may be or comprise amalgamations of such labels or categories, such as "dog-like animals" or "canines of the wild." Alternatively, the pseudolabel may relate to a specific task or function, or may have nothing to do with the images or the labels themselves, or the tasks or functions performed on such images or the labels identified thereby, such as the pseudolabels assigned to the cluster and subclusters of FIGS. 1A to 1C.

At box 360, a second feature transformation is performed using a second training set comprising at least some of the images that were used to train the first feature transformation at box 320 and the pseudolabels assigned to the clusters of labels or categories at box 350 as training inputs. For example, images that are determined to be associated with a specific label or in a certain category that are included in a cluster may also be tagged or associated with a pseudolabel of the cluster. The training inputs may include the images themselves, or any attributes of such images, including but not limited to characteristics of the respective images or the contents thereof, e.g., information or data regarding any edges, contours, outlines, colors, textures, silhouettes, shapes or other characteristics that may be expressed within such images.

At box 370, the second feature transformation is trained to associate the images with their respective pseudolabels using the second training set, and at box 380, training outputs including pseudolabels identified as associated with images are received from the second feature transformation. At box 390, the second feature transformation is confirmed to be adequately trained to associate images with pseudolabels of clusters, and the process ends. As is discussed above, the training of the second feature transformation may be evaluated or confirmed with the use of one or more test sets of images and known pseudolabels, with the images of the test set being provided to the second feature transformation as inputs, and the outputs being compared to the known pseudolabels to determine the adequacy or the extent to which the second feature transformation has been properly trained. To the extent that the pseudolabels received at box 380 are sufficiently consistent with the images of the training set and their associated pseudolabels, the second feature transformation may be deemed adequately trained, and ready to associate other images with a discrete pseudolabel.

Figure 4:
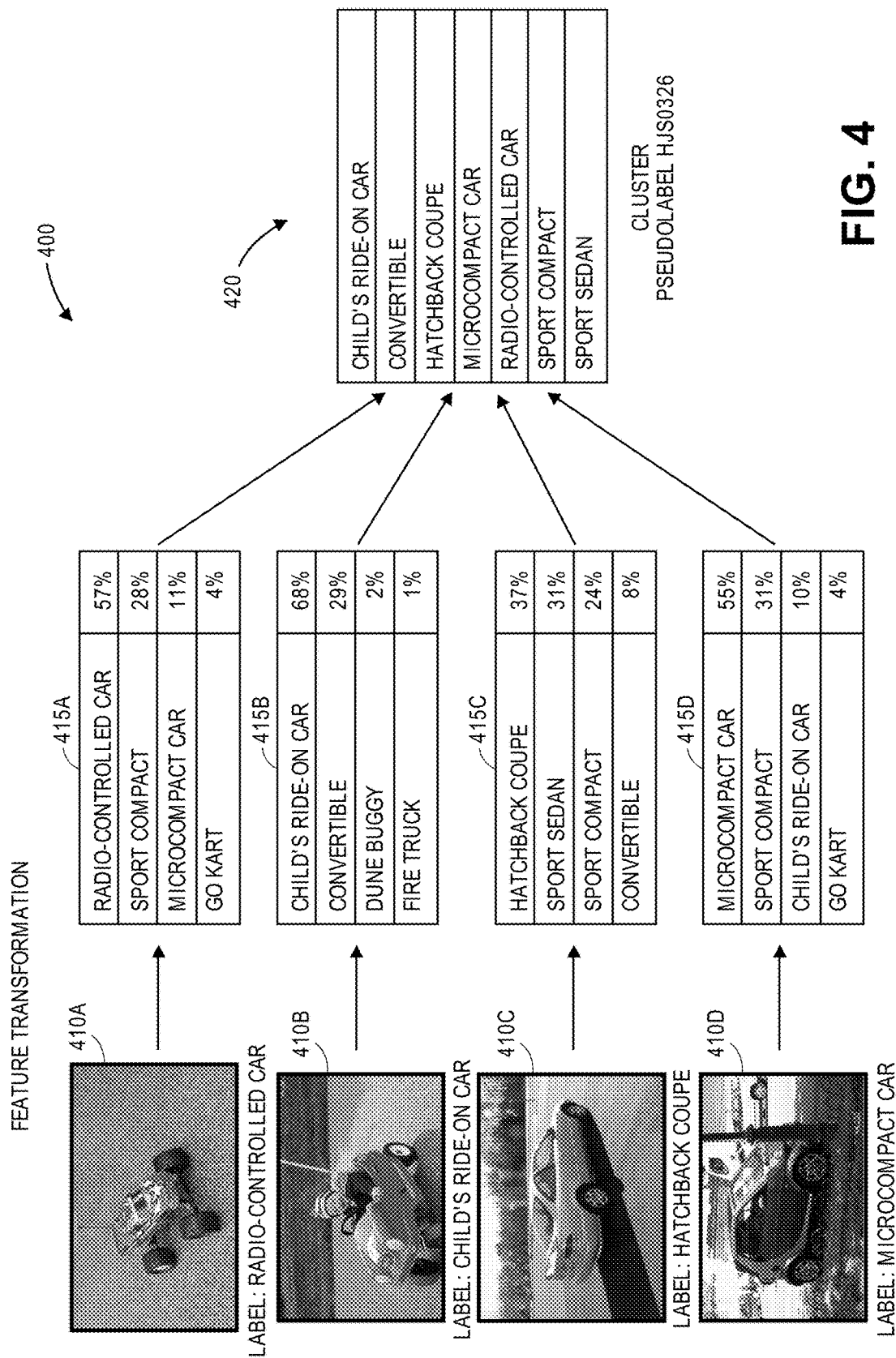
FIG. 4 is a view of aspects of one image processing system in accordance with embodiments of the present disclosure.

The processes by which a machine learning tool (e.g., a neural network, a classifier or another algorithm or system, such as an artificial neural network) may be trained to associate an image with a cluster of labels or categories may be shown in FIG. 4. Referring to FIG. 4, aspects of one image processing system 400 in accordance with embodiments of the present disclosure are shown. Except where otherwise noted, reference numerals preceded by the number "4" shown in the system 400 of FIG. 4 indicate components or features that are similar to components or features having reference numerals preceded by the number "2" shown in the block diagram 200 of FIG. 2, or by the number "1" shown in the system 100 of FIG. 1A through 1C.

As is shown in FIG. 4, images 410A, 410B, 410C, 410D are provided to a machine learning tool configured to perform a feature transformation as training inputs, and sets of labels or categories 415A, 415B, 415C, 415D are received from the machine learning tool as training outputs. The sets of labels or categories 415A, 415B, 415C, 415D include not only the labels or categories identified by the machine learning tool as associated with each of the images but also percentages or shares representative of the frequency with which the respective labels or categories were so identified. For example, with regard to the image 410A, the set 415A indicates that the image 410A was properly identified as including a radio-controlled car fifty-seven percent (57%) of the time, while the image 410A was identified as including a sport compact car twenty-eight percent (28%) of the time, a microcompact car eleven percent (11%) of the time and a go kart four percent (4%) of the time.

Likewise, as is shown in FIG. 4, the set 415B indicates that the image 410B was properly identified as including a child's ride-on car sixty-eight percent (68%) of the time, while the image 410B was identified as including a convertible car twenty-nine percent (29%) of the time, a dune buggy two percent (2%) of the time and a fire truck one percent (1%) of the time. The set 415C indicates that the image 410C was properly identified as including a hatchback coupe thirty-seven percent (37%) of the time, while the image 410C was identified as including a sport sedan thirty-one percent (31%) of the time, a sport compact car twenty-four percent (24%) of the time and a convertible car eight percent (8%) of the time. The set 415D indicates that the image 410D was properly identified as including a microcompact car fifty-five percent (55%) of the time, while the image 410D was identified as including a sport compact car thirty-one percent (31%) of the time, a child's ride-on car ten percent (10%) of the time and a go kart four percent (4%) of the time.

In accordance with the present disclosure, a cluster of labels or categories that are commonly and mutually confused with one another may be defined based on the outputs of a machine learning tool. For example, where a plurality of images are provided to a machine learning tool that is configured to perform a feature transformation, outputs received from the machine learning tool that may include not only the labels or categories that are actually associated with the respective images but also the labels or categories mistakenly associated with such images, with a non-negligible frequency or number, may be grouped together in a cluster, and a pseudolabel may be applied to the cluster. Referring again to FIG. 4, the cluster 420 includes the labels or categories that were associated with the respective images more than five percent (5%) of the time, and a pseudolabel, viz., HJS0326, is assigned thereto. For example, the cluster 420 includes the three labels or categories most commonly identified as associated with the image 410A, the two labels or categories most commonly identified as associated with the image 410B, the three labels or categories most commonly identified as associated with the image 410C and the three labels or categories most commonly identified as associated with the image 410D.

Once the cluster 420 is defined as including labels or categories that are mutually confused with one another, the pseudolabel is assigned to the cluster 420. As is discussed above, the pseudolabel may be derived based on one or more of the labels or categories in the cluster 420, or may have no relation to any of the labels or categories or the images 410A, 410B, 410C, 410D therein. Subsequently, the images 410A, 410B, 410C, 410D and the cluster 420 and/or pseudolabel may be provided to a machine learning tool (e.g., an artificial neural network) and used to train the machine learning tool to associate images with the cluster 420 and/or the pseudolabel.

In accordance with the present disclosure, once a machine learning tool is trained to associate images with clusters, the trained machine learning tool may be used to reduce the number of steps required in order to perform image labeling or classification functions or operations. For example, a machine learning tool trained to associate an image with one of a plurality of clusters may coarsely filter images into a given set of labels or categories, defined by one of the clusters, thereby minimizing the number of processing tasks required to ultimately associate a given image with a given label or category. Once an image has been determined to be associated with a given cluster of labels or categories, a specific label or category within the cluster may be identified by any number of means. For example, in some instances, depending on the characteristics of the given cluster, a specific label or category may be identified for the image based on the mere fact that the image is within the cluster. Alternatively, a traditional image processing analysis, which may be computationally expensive, may be performed on the image along with the knowledge that the image is associated with the given cluster, i.e., that the label or category associated with the image is one of the labels or categories within the cluster. Further, as is discussed above with regard to FIGS. 1A through 1C, a cluster itself may be subdivided into two or more subclusters, and a process similar to that which identified an image as associated with the cluster may also be performed to determine with which of the subclusters the image is also associated. The identification of subclusters within a cluster may be repeated for any number of subclusters and sub-subclusters, or any number of sub-subclusters and sub-sub-subclusters, and so on and so forth, such as is shown in FIGS. 1A through 1C, as may be desired or required.

Figure 5:
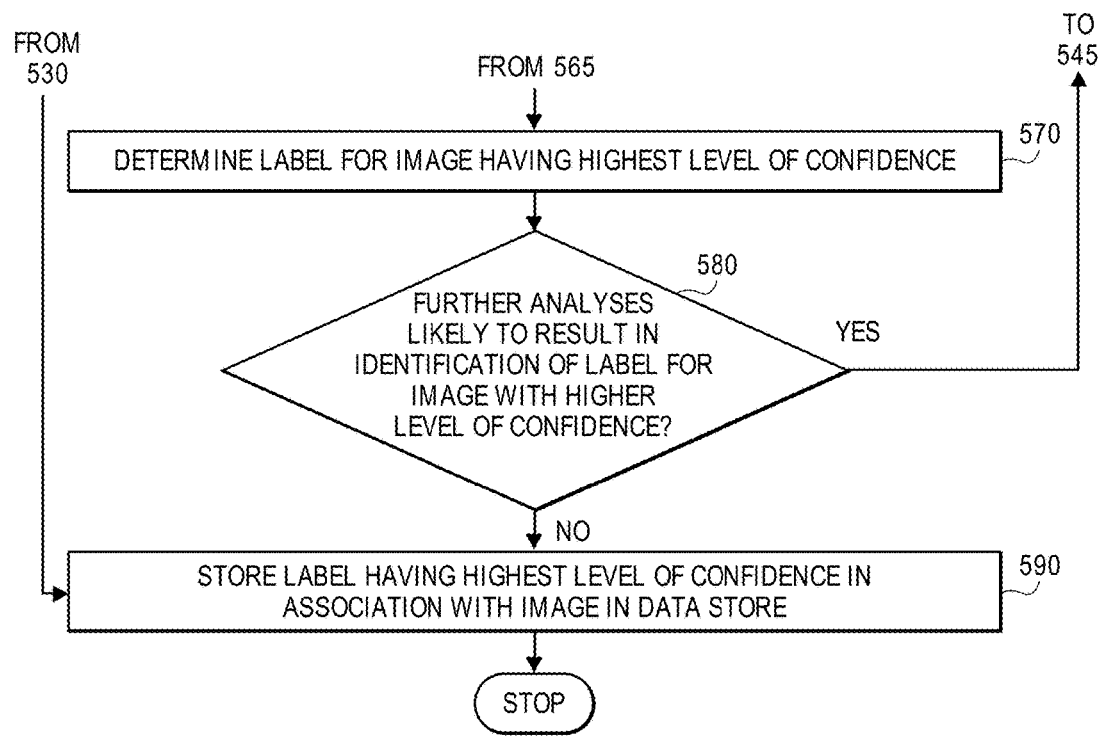
FIG. 5 is a flow chart of one process for processing imaging data in accordance with embodiments of the present disclosure.

Referring to FIG. 5, a flow chart 500 representing one embodiment of a process for processing imaging data in accordance with the present disclosure is shown. At box 510, an original feature transformation trained to identify a cluster of labels is performed using attributes of an image as an input. Such attributes may describe or relate to any edges, contours, outlines, colors, textures, silhouettes, shapes or other characteristics that may be expressed within such images. At box 515, an output is received from the original feature transformation. The output may identify a single cluster, and at box 520, an original pseudolabel corresponding to the cluster is identified for the image based on the output. The output received from the trained classifier may comprise a single pseudolabel, or a list of pseudolabels ranked by the respective probabilities or likelihoods that the image is associated with such pseudolabels. At box 525, the image is assigned to a cluster associated with the original pseudolabel. For example, the image may be tagged, marked or otherwise amended to include metadata identifying the original pseudolabel or the cluster. Alternatively, an association between the image and the pseudolabel or the cluster may be stored in a record or data file maintained in at least one data store.

At box 530, whether a label may be identified for the image based on the cluster to which the image is assigned with a sufficient level of confidence is determined. For example, if the image includes the color blue and is assigned to a given cluster, and a single label within the cluster is associated within a blue image, then the image may be deemed associated with that label. If such a label may be identified with a sufficiently high level of confidence, then the process advances to box 590, where the identified label is stored in association with that image in a data store, and the process ends.

If a label may not be identified with a sufficiently high level of confidence based on the cluster to which the image is assigned, then the process advances to box 540, where a next feature transformation, e.g., another discrete set of processing calculations or computations, is selected based on the output received from the original feature transformation. At box 545, the next feature transformation is performed on the image and the outputs received from prior feature transformations, e.g., the original feature transformation performed at box 510, as inputs. For example, after the image has been determined to be associated with a given cluster, an identifier of that cluster, e.g., the pseudolabel, may be added or appended to the various attributes of the image for consideration in further image processing applications. In this regard, rather than specifically identifying the various attributes which resulted in an identification of a cluster to which the image was assigned at box 525, the pseudolabel of that cluster may be included as one of the attributes that may be provided to a machine learning tool configured to perform the next feature transformation.

At box 550, an output is received from the next feature transformation, and at box 555, a new pseudolabel for the image is identified based on the output received from the next feature transformation. Where the image is identified as a part of a cluster of labels or categories, and attributes of the image and the new pseudolabel of that cluster are provided to a classifier trained to perform the next feature transformation, a subset of the labels or categories of the cluster may be identified based on such attributes and the new pseudolabel, thereby further narrowing the size of the set of labels or categories with which the image may be associated, and the processing calculations or computations required in order to identify a single label or category for the image. For example, referring again to FIGS. 1A through 1C, the subcluster 130, which is narrower than the cluster 120, may be identified based on the image 110 and the attribute 112. At box 560, the image is assigned to a subcluster associated with the new pseudolabel.

At box 565, whether a label may be identified for the image based on the subcluster to which the image was assigned with a sufficient level of confidence is determined. If one of the labels within the subcluster may be adequately identified based on the various attributes of the image, including but not limited to the cluster and subcluster to which the image is assigned, with a sufficiently high degree of confidence, then the process advances to box 590, where the identified label having the highest level of confidence is stored in association with the image in a data store, and the process ends.

If a label may not be identified based on the subcluster to which the image is assigned, then the process advances to box 570, where a label having the highest level of confidence for the image is determined based on the outputs received from the machine learning tool. At box 580, whether further analyses are likely to result in an identification of a label for the image with a level of confidence higher than the level of confidence of the label identified at box 570 is determined. For example, if it is determined that the size of a subcluster to which the image was assigned at box 560 is not likely to decrease, e.g., that the set of labels or categories within the subcluster is not likely to be narrowed, following further processing using a trained machine learning tool, then the process advances to box 590, where the identified label having the highest level of confidence at box 570 is stored in association with the image in a data store, and the process ends.

However, if it is determined that further processing may result in a narrowing of the labels or categories within the subcluster identified at box 560, then the process returns to box 540, where a next feature transformation is selected based on the outputs received from prior feature transformations, and to box 545, where the next feature transformation is performed on the image and the outputs received from the prior feature transformations.

As is discussed above, using trained machine learning tools (such as classifiers or neural networks) to identify clusters of labels or categories associated with an image, rather than labels or categories themselves, may economize processes in which a label or a category is ultimately identified for the image. The use of trained machine learning tools in this regard minimizes the number of computations required in order to ultimately arrive at a label or category for the image with a highest degree of confidence. Referring to FIG. 6A through 6F, aspects of one image processing system 600 in accordance with embodiments of the present disclosure are shown. Except where otherwise noted, reference numerals preceded by the number "6" shown in the system 600 of FIG. 6 indicate components or features that are similar to components or features having reference numerals preceded by the number "4" shown in the system 400 of FIG. 4, by the number "2" shown in the block diagram 200 of FIG. 2, or by the number "1" shown in the system 100 of FIGS. 1A through 1C.

Figure 6B:
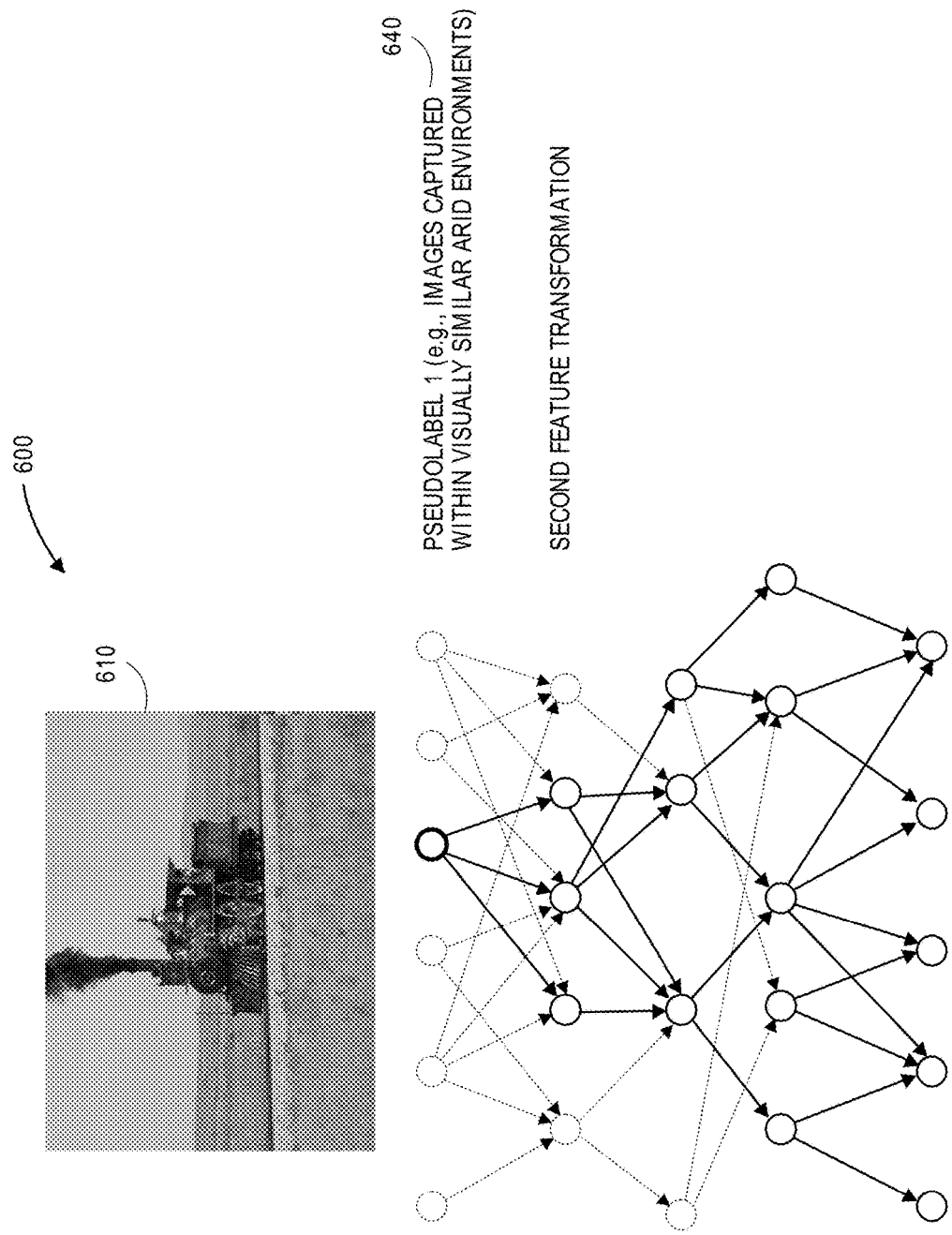

As is shown in FIG. 6A, an image 610 of a black steam-powered locomotive with gold trim that is traveling through a desert is shown. The image 610 may be subjected to a first feature transformation, or a set of processing calculations or computations associated with a predetermined operation or function, such as one or more character recognition, edge detection, image compression, image correction, image filtering, image modeling, image noise reduction, image quantization, image sampling, image scaling, image segmentation, image sharpening, image smoothing, image transformation, image zooming or object recognition techniques. As a result of the first feature transformation, such as is shown in FIG. 6B, the image 610 may be associated with a first cluster of labels, e.g., images captured within visually similar arid environments, to which a first pseudolabel 640 has been assigned. The first feature transformation therefore reduces a number of computations that need to be performed in order to identify a label associated with the image 610, in that computations that are unrelated to the first cluster of labels, or to resolving that the image 610 includes an arid environment, need not be performed.

Figure 6C:
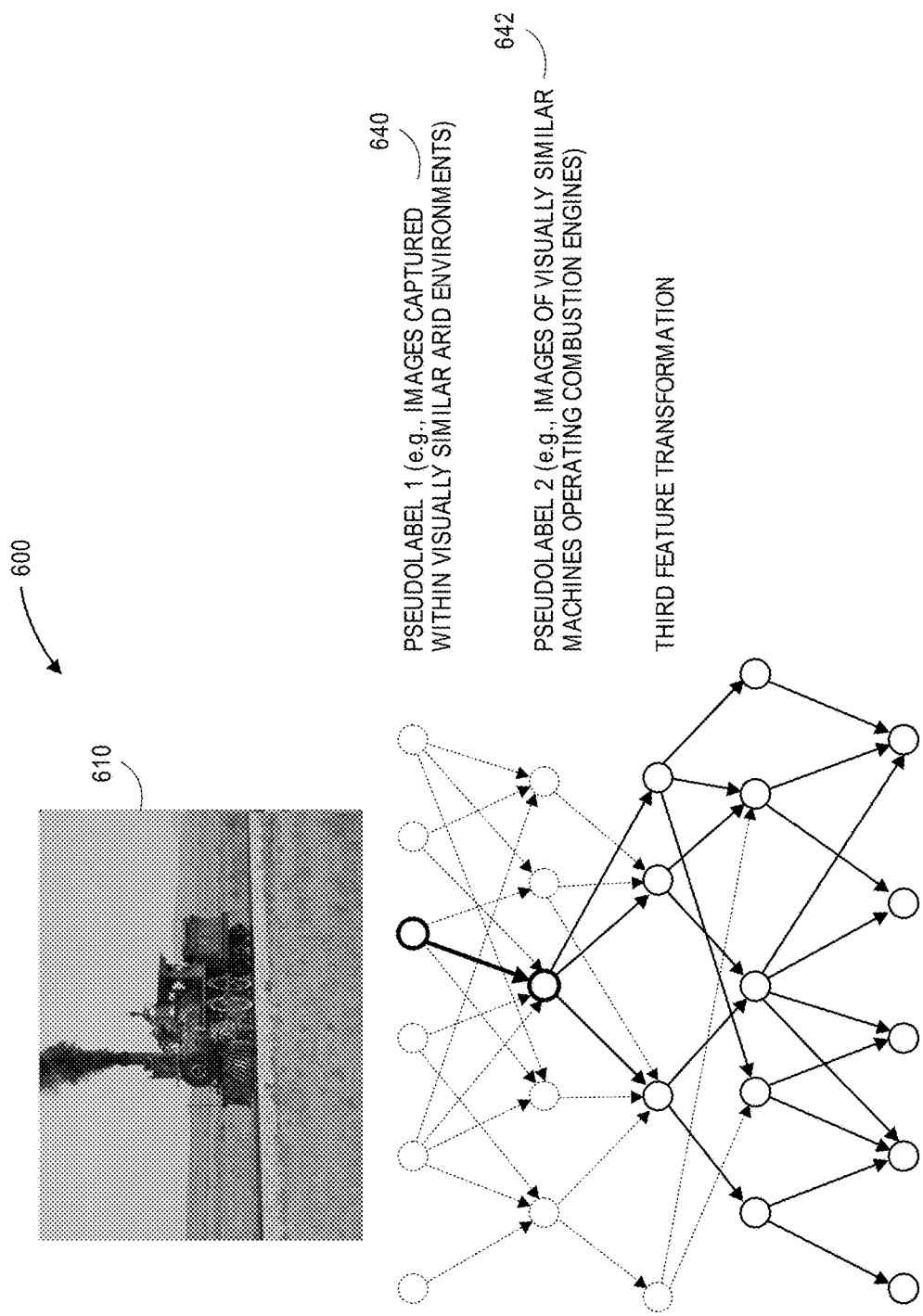

If a label or category of the image 610 may not be identified with a sufficiently high degree of confidence after the first feature transformation, the image 610 may be further subjected to a second feature transformation, in which the image 610 and the first pseudolabel 640 may be considered. As is shown in FIG. 6C, as a result of the second feature transformation, the image 610 may be associated with a second cluster of labels, e.g., images of visually similar machines operating combustion engines, to which a second pseudolabel 642 has been assigned. Like the first feature transformation, the second feature transformation further reduces the number of computations that need to be performed in order to identify a label associated with the image 610 with a sufficiently high degree of confidence, in that computations that are unrelated to the second cluster of labels, or to resolving that the image 610 includes a visually similar machine operating a combustion engine in an arid environment, need not be performed.

Figure 6D:
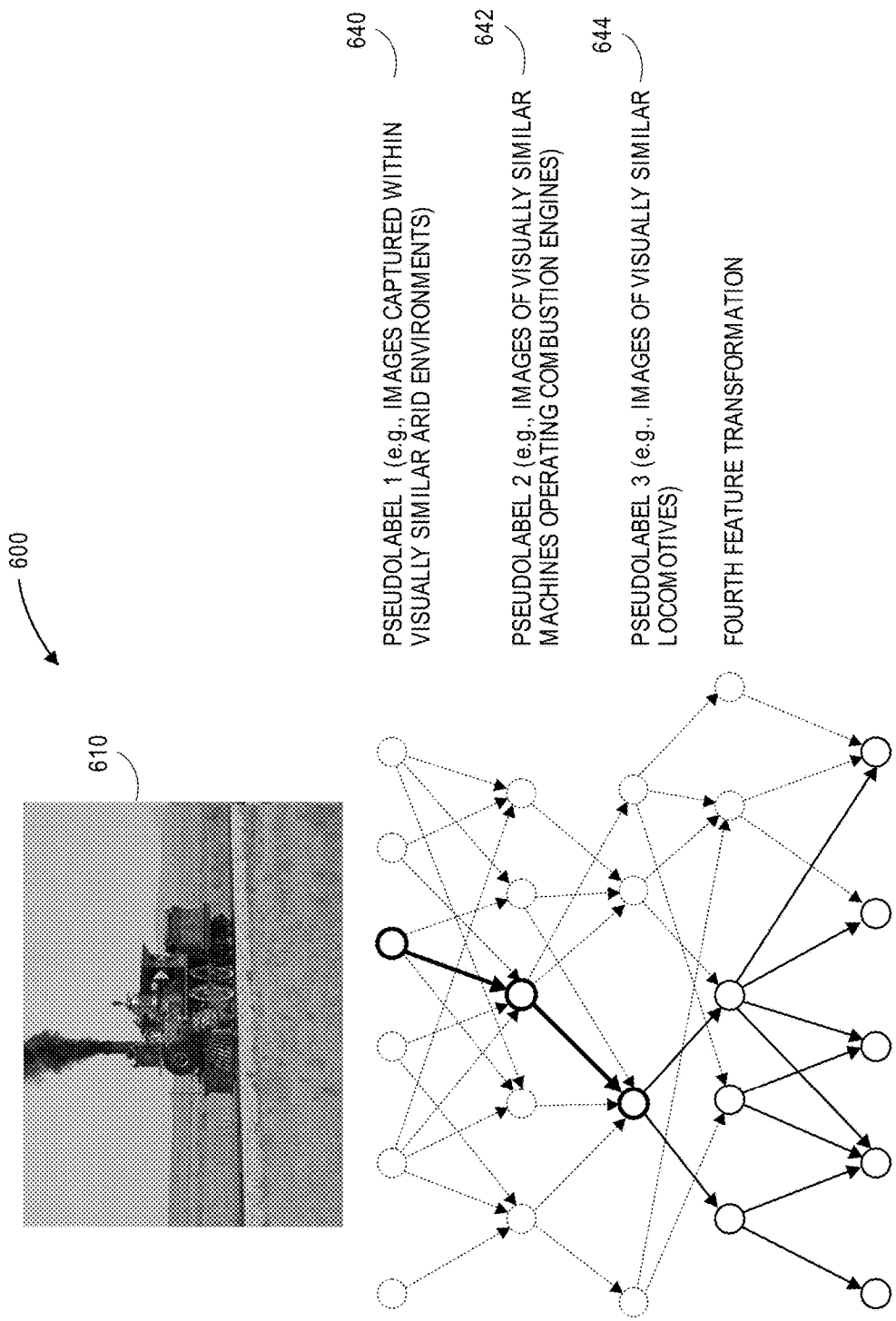
Figure 6E:
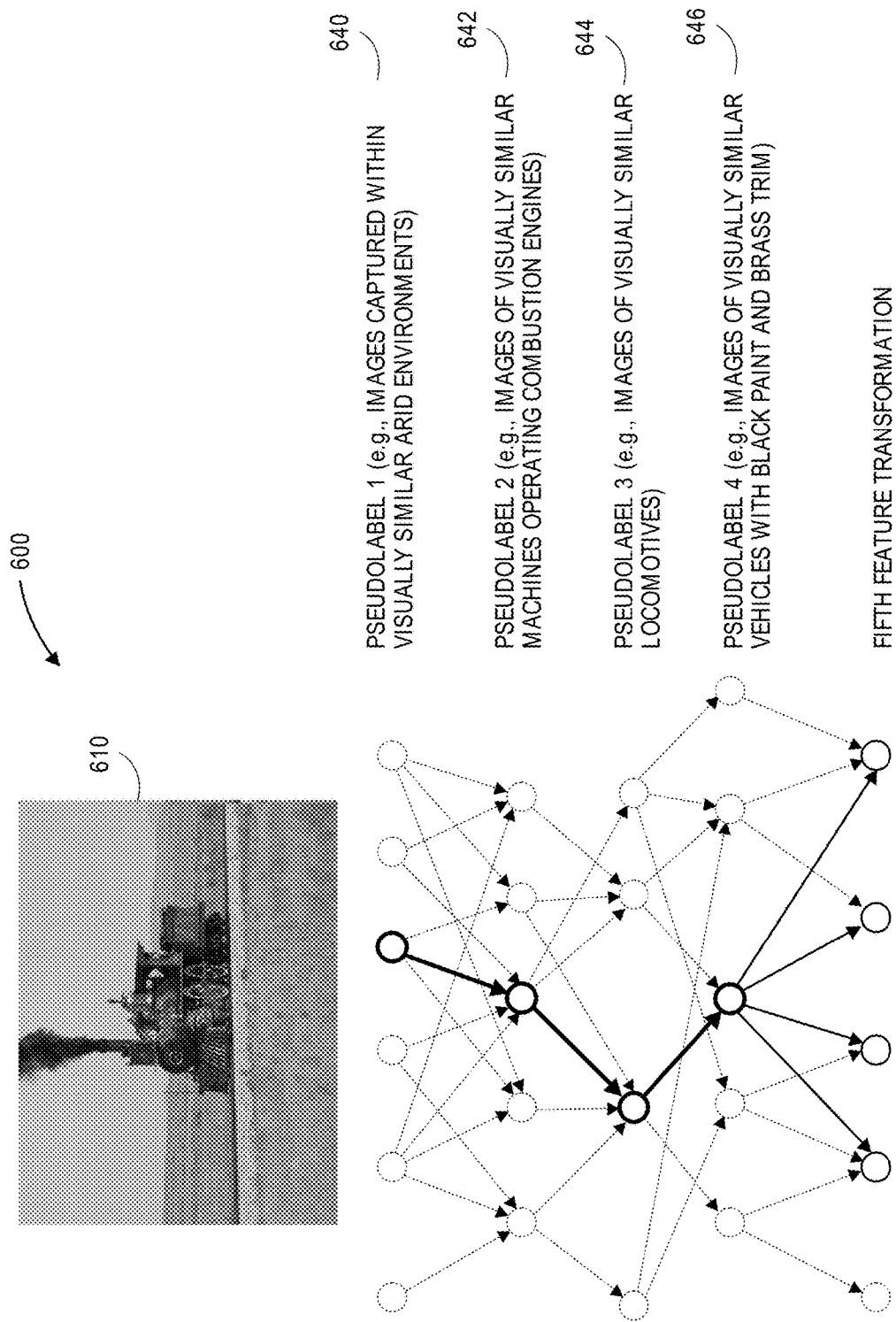

Similarly, if a label or category of the image 610 may not be identified with a sufficiently high degree of confidence after the second feature transformation, the image 610 may be further subjected to a third feature transformation, in which the image 610 and the first and second pseudolabels 640, 642 may be considered. As is shown in FIG. 6D, as a result of the third feature transformation, the image 610 may be associated with a third cluster of labels, e.g., images of visually similar locomotives, to which a third pseudolabel 644 has been assigned. Like the first and second feature transformations, the third feature transformation further reduces the number of computations that need to be performed in order to identify a label associated with the image 610 with a sufficiently high degree of confidence, as computations that are unrelated to the third cluster of labels, or to resolving that the image 610 includes a visually similar locomotive operating a combustion engine in an arid environment, need not be performed. Likewise, if a label or category of the image 610 may not be identified with a sufficiently high degree of tolerance after the third feature transformation, the image 610 may be subjected to a fourth feature transformation, in which the image 610 and the pseudolabels 640, 642, 644 may be considered. As a result of the fourth feature transformation, the image 610 may be associated with a fourth cluster of labels, e.g., images of visually similar vehicles having black paint and brass trim, to which a fourth pseudolabel 646 has been assigned, as is shown in FIG. 6E.

Figure 6F:
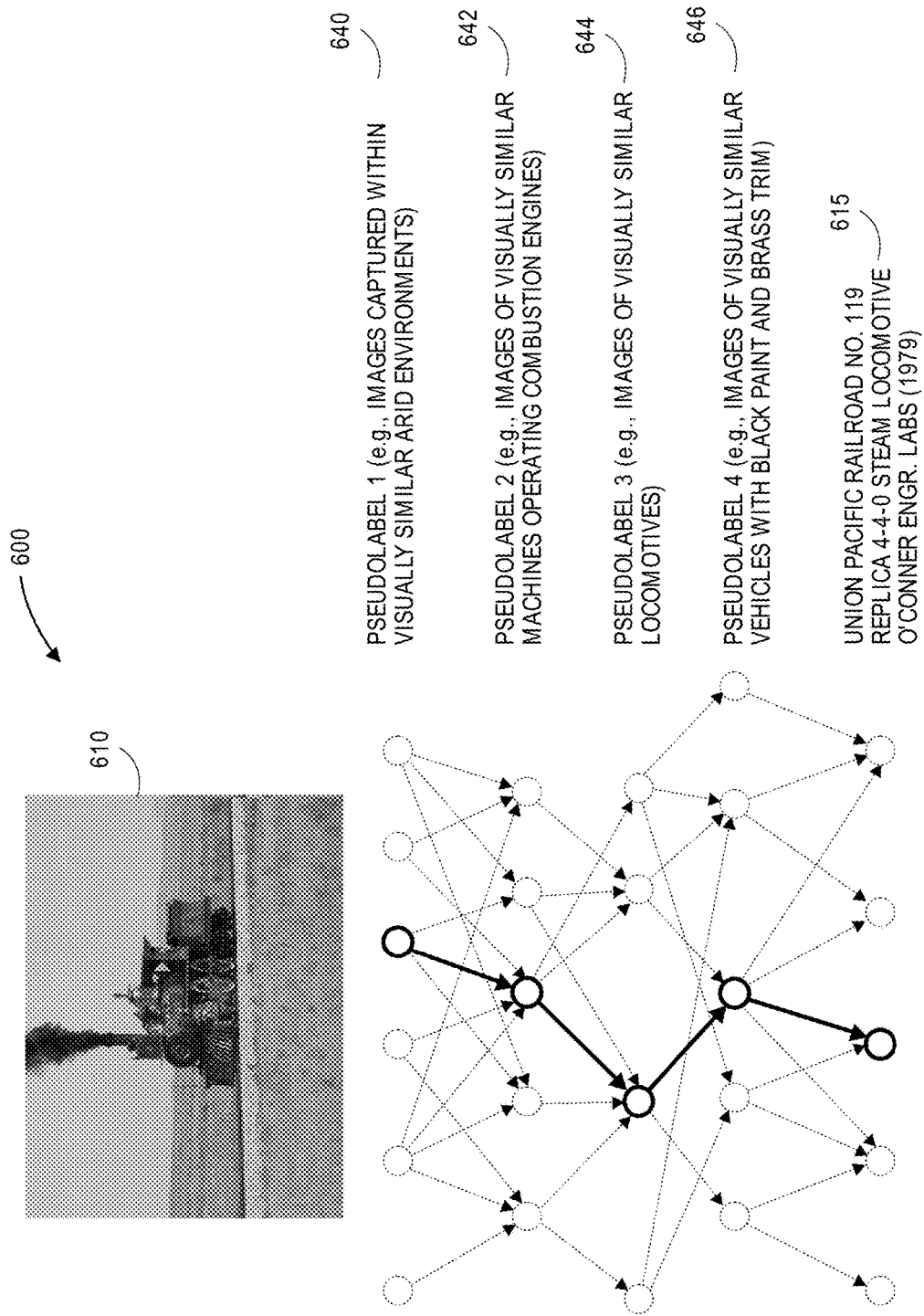

Finally, if a label or category of the image 610 may not be identified with a sufficiently high degree of tolerance after the fourth feature transformation, the image 610 may be subjected to a fifth feature transformation, in which the image 610 and the pseudolabels 640, 642, 644, 646 may be considered. As a result of the fifth feature transformation, is shown in FIG. 6F, a label 648 of the image 610, viz., that the image 610 depicts a Union Pacific Railroad No. 119, Replica 4-4-0 Steam Locomotive, manufactured by O'Conner Engineering Laboratories of Costa Mesa, Calif., in 1979, may be identified.

In accordance with the systems and methods of the present disclosure, any number of feature transformations or sets of computations may be performed, and a degree of confidence may be defined to any extent. Labels or categories may be identified for images in any manner, and to any degree of specificity or particularity, in accordance with the present disclosure.

Referring to FIG. 7, a flow chart 700 representing one embodiment of a process for processing imaging data in accordance with the present disclosure is shown. At box 710, an image to be processed is identified, and at box 720, an original feature transformation is performed on the image. The original feature transformation may be any layer of mathematical computations on the image associated with one or more image processing functions or operations. At box 730, whether a label associated with the image may be identified at a sufficient level of confidence is determined. If such a label may be identified, then the process advances to box 790, where the identified label is stored in association with the image in a data store.

If such a label may not be identified, however, then the process advances to box 740, where information regarding the contents of the image is identified based at least in part on an output of the original feature transformation. Such information may include one or more attributes of the image, e.g., information or data regarding one or more edges, contours, outlines, colors, textures, silhouettes, shapes or other characteristics of objects within the image, or portions of such objects. At box 750, a next feature transformation is selected based on the information regarding the content of the image determined at box 740. The next feature transformation may be selected in a manner that considers the output of the original feature transformation, and any information identified thereby, or any other relevant information that may be known regarding the image. At box 760, the next feature transformation is performed based on both the image itself, and the available information regarding the content of the image, including but not limited to the information identified at box 740.

At box 770, whether a label associated with the image may be identified with a sufficient level of confidence based on the output from the next feature transformation performed at box 760 is determined. If the output of the feature transformation enables a specific label or category of a cluster of images or categories to be associated with the image with a high degree of confidence, then the process advances to box 790, where the identified label or category is stored in association with the image in a data store.

If such a label or category may not be identified, however, then the process advances to box 780, where the information regarding the content of the image is updated to include the output of the next feature transformation performed at box 760. For example, referring again to FIGS. 1A through 1C, where a feature transformation results in an identification of further attributes or descriptors of features of the image, including but not limited to the attributes 112, 114, 116, 118, information regarding such attributes or descriptors may be appended to the information regarding the content of the image and may thus augment the image in further analyses. At box 785, whether further feature transformations are likely to result in an identification of a label associated with the image at a higher level of confidence is determined. If further feature transformations are not likely to identify such a label, then the label having the highest level of confidence is stored in association with the image in a data store at box 790, and the process ends. If further feature transformations are likely to enable such a label to be identified, then the process returns to box 750, where a next feature transformation to be performed is selected based on the updated information regarding the content of the image.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the processing of imaging data for image classification purposes, the systems and methods disclosed herein are not so limited, and may be used to process any type of information or data obtained or identified in any environment and for any purpose. For example, the systems and methods disclosed herein may be used to perform any type or form of compression, correction, filtering, modeling, noise reduction, quantization, sampling, scaling, segmentation, transformation or zooming operations, or any other processing evolution.

Additionally, in accordance with the present disclosure, the training of machine learning tools (e.g., artificial neural networks or other classifiers) and the use of the trained machine learning tools to identify clusters associated with images may occur on multiple, distributed computing devices, or on a single computing device, including but not limited to computing devices residing and/or operating on an imaging device that has captured an image to be labeled, e.g., using one or more of the computer processors 226 on the imaging device 220 of FIG. 2.

Furthermore, although some embodiments of the present disclosure reference the use of separate machine learning tools for defining clusters of labels or categories, and for associating an image with a cluster or a pseudolabel associated with the cluster, the systems and methods of the present disclosure are not so limited. Clusters may be defined and also associated with images using a single machine learning tool, or with two or more machine learning tools, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
    performing a first feature transformation on a first plurality of inputs by a first classifier using at least one computer processor, wherein each of the first plurality of inputs comprises at least one of a plurality of images, and wherein the first classifier is configured to associate labels with images;
    receiving a first plurality of outputs from the first feature transformation using the at least one computer processor, wherein each of the first plurality of outputs comprises at least one of a plurality of labels identified as associated with one of the plurality of images;
    defining a plurality of clusters of the plurality of labels based at least in part on the first plurality of outputs using the at least one computer processor, wherein each of the plurality of clusters is a subset of the plurality of labels commonly associated with at least one of the plurality of images;
    assigning a pseudolabel to each of the plurality of clusters using the at least one computer processor;
    performing a second feature transformation on a first input by a second classifier using the at least one computer processor, wherein the first input comprises a first image, and wherein the second classifier is configured to associate pseudolabels with images;
    receiving a first output from the second feature transformation using the at least one computer processor, wherein the first output comprises a first pseudolabel identified as associated with the first image;
    identifying a first cluster based at least in part on the first pseudolabel using the at least one computer processor, wherein the first cluster comprises a first subset of the plurality of labels;
    selecting one of the labels of the first subset; and
    storing information regarding the selected one of the labels of the first subset in association with the first image in at least one data store.

2. The computer-implemented method of claim 1, wherein each of the first plurality of outputs further comprises at least one degree of confidence in an association of the at least one of the plurality of labels with the one of the plurality of images.

3. The computer-implemented method of claim 2, wherein defining the plurality of clusters of the plurality of labels further comprises:
    identifying a first label having at least a first degree of confidence in an association with one of the plurality of images;
    identifying a second label having at least a second degree of confidence in the association with the one of the plurality of images; and
    defining the first cluster of the plurality of labels to include at least the first label and the second label.

4. The computer-implemented method of claim 1, wherein selecting one of the labels of the first subset further comprises:
    performing a third feature transformation on a second input by the second classifier using the at least one computer processor, wherein the second input comprises the first image and the first pseudolabel;
    receiving a second output from the third feature transformation using the at least one computer processor, wherein the second output comprises a second pseudolabel identified as associated with the first image;
    identifying a second cluster based at least in part on the second pseudolabel using the at least one computer processor, wherein the second cluster comprises a second subset of the first subset of the plurality of labels;
    selecting one of the labels of the second subset; and
    storing information regarding the selected one of the labels of the second subset in association with the first image in at least one data store.

5. A computer-implemented method comprising:
    providing a first input to a first machine learning tool associated with a predetermined task using at least one computer processor, wherein the first input comprises a first image;
    performing a first feature transformation on the first input by the first machine learning tool using the at least one computer processor;
    receiving a first output from the first machine learning tool using the at least one computer processor, wherein the first output comprises first information regarding the first image;
    identifying a first cluster of labels based at least in part on the first output;
    selecting one of the labels of the first cluster based at least in part on the first information regarding the first image; and
    storing the selected one of the labels of the first cluster in association with the first image in at least one data store.

6. The computer-implemented method of claim 5, wherein the first information regarding the first image comprises a first pseudolabel assigned to the first cluster of labels.

7. The computer-implemented method of claim 5, wherein selecting the one of the labels of the first cluster further comprises:
    providing a second input to the first machine learning tool associated with the predetermined task using the at least one computer processor, wherein the second input comprises the first image and at least some of the first information regarding the first image;

performing a second feature transformation on the second input by the first machine learning tool using the at least one computer processor;

receiving a second output from the first machine learning tool using the at least one computer processor, wherein the second output comprises second information regarding the first image;

identifying a second cluster of labels based at least in part on the second output, wherein the second cluster is a subset of the first cluster; and selecting the one of the labels of the first cluster based at least in part on the second information regarding the first image, wherein the selected one of the labels of the first cluster is one of the labels of the second cluster.

8. The computer-implemented method of claim 7, wherein selecting the one of the labels of the first cluster further comprises:

providing a third input to the first machine learning tool associated with the predetermined task using the at least one computer processor, wherein the third input comprises the first image and at least some of the second information;

performing a third feature transformation on the third input by the first machine learning tool using the at least one computer processor;

receiving a third output from the first machine learning tool using the at least one computer processor, wherein the third output comprises third information regarding the first image;

identifying a third cluster of labels based at least in part on the third information regarding the first image, wherein the third cluster is a subset of the second cluster; and selecting the one of the labels of the first cluster based at least in part on the third information regarding the first image, wherein the selected one of the labels of the first cluster is one of the labels of the third cluster.

9. The computer-implemented method of claim 7, further comprising:

selecting the second feature transformation based at least in part on the first information regarding the first image.

10. The computer-implemented method of claim 5, further comprising:

determining a first degree of confidence in a first association between the first image and the selected one of the labels of the first cluster;

determining that the first degree of confidence in the first association between the first image and the selected one of the labels of the first cluster does not exceed a predetermined threshold;

providing a second input to the first machine learning tool associated with the predetermined task using the at least one computer processor, wherein the second input comprises the first image and at least some of the first information regarding the first image;

performing a second feature transformation on the second input by the first machine learning tool using the at least one computer processor;

receiving a second output from the first machine learning tool using the at least one computer processor, wherein the second output comprises second information regarding the first image;

identifying a second cluster of labels based at least in part on the second output, wherein the second cluster is a subset of the first cluster;

selecting one of the labels of the second cluster based at least in part on the second information regarding the first image; and storing the selected one of the labels of the second cluster in association with the first image in at least one data store.

11. The computer-implemented method of claim 5, further comprising:

providing a set of training inputs to a second machine learning tool associated with the predetermined task using the at least one computer processor, wherein each of the training inputs comprises a training image;

receiving a plurality of training outputs from the second machine learning tool, wherein each of the training outputs comprises a label identified as associated with one of the training images; and defining a plurality of clusters of labels based at least in part on the training outputs, wherein at least two of the labels in each of the clusters is identified as associated with one of the training images, and wherein the first cluster is one of the plurality of clusters.

12. The computer-implemented method of claim 11, further comprising:

assigning a pseudolabel to each of the plurality of clusters.

13. The computer-implemented method of claim 11, wherein a first one of the training inputs comprises a first label identified as associated with a first one of the training images to a first degree of confidence, wherein a second one of the training inputs comprises a second label identified as associated with the first one of the training images to a second degree of confidence, and wherein the method further comprises:

defining the first cluster including at least the first label and the second label.

14. The computer-implemented method of claim 13, wherein defining the first cluster further comprises:

determining that the first degree of confidence exceeds a predetermined threshold; and determining that the second degree of confidence exceeds the predetermined threshold.

15. The computer-implemented method of claim 5, wherein the first machine learning tool is trained to associate images with at least one of clusters of labels or pseudolabels assigned to the clusters of labels, and wherein the first machine learning tool is at least one of:
an artificial neural network;
a classifier;
a cosine similarity;
a factorization method;
a K-means clustering analysis;
a latent Dirichlet allocation;
a latent semantic analysis;
a log likelihood similarity;
a nearest neighbor method;
a similarity measure; or
a topic model.

16. The computer-implemented method of claim 5, wherein the predetermined task is a function for at least one of:
character recognition;
edge detection;
image classification;
image compression;
image correction;
image filtering;
image modeling;

image noise reduction;
image quantization;
image sampling;
image scaling;
image segmentation;
image sharpening;
image smoothing;
image transformation;
image zooming; or
object recognition.

17. An imaging device comprising:
an imaging sensor;
at least one memory device; and
at least one computer processor,
wherein the at least one computer processor is configured to at least:
  capture a first image using the imaging sensor;
  provide a first input comprising the first image to a first machine learning tool, wherein the first machine learning tool is configured to associate an image with one of a plurality of clusters of labels;
  receive a first output from the first machine learning tool, wherein the first output comprises a first pseudolabel associated with a first cluster of the plurality of clusters of labels;
  identify the first cluster based at least in part on the first pseudolabel;
  determine whether one of the labels of the first cluster may be associated with the first image to a predetermined degree of confidence; and
  upon determining that the one of the labels of the first cluster may be associated with the first image to the predetermined degree of confidence,
    store an association of the one of the labels of the first cluster with the first image in the at least one memory device.

18. The imaging device of claim 17, wherein the at least one computer processor is further configured to at least:
  upon determining that the one of the labels of the first cluster may not be associated with the first image to the predetermined degree of confidence,
    provide a second input comprising the first image and the first pseudolabel to the first machine learning tool;
    receive a second output from the first machine learning tool, wherein the second output comprises a second pseudolabel associated with a second cluster of the plurality of clusters of labels; and
    identify the second cluster based at least in part on the second pseudolabel, wherein the second cluster is a subset of the first cluster.

19. The imaging device of claim 18, wherein the at least one computer processor is further configured to at least:
  determine whether one of the labels of the second cluster may be associated with the first image to the predetermined degree of confidence; and
  upon determining that the one of the labels of the second cluster may be associated with the first image to the predetermined degree of confidence,
    store the association of the one of the labels of the second cluster with the first image in the at least one memory device.

20. The imaging device of claim 17, wherein the first machine learning tool is at least one of:
an artificial neural network;
a classifier;
a cosine similarity;
a factorization method;
a K-means clustering analysis;
a latent Dirichlet allocation;
a latent semantic analysis;
a log likelihood similarity;
a nearest neighbor method;
a similarity measure; or
a topic model.

* * * * *